(12) United States Patent
Akiyoshi et al.

(10) Patent No.: US 7,050,637 B2
(45) Date of Patent: May 23, 2006

(54) IMAGE CODING METHOD AND APPARATUS AND IMAGE DECODING METHOD AND APPARATUS

(75) Inventors: Kozo Akiyoshi, Tokyo (JP); Nobuo Akiyoshi, Tokyo (JP)

(73) Assignee: Monolith Co., Ltd., Tokyo (JP)

( * ) Notice: Subject to any disclaimer, the term of this patent is extended or adjusted under 35 U.S.C. 154(b) by 770 days.

(21) Appl. No.: 10/092,205

(22) Filed: Mar. 7, 2002

(65) Prior Publication Data

US 2003/0185307 A9   Oct. 2, 2003

(30) Foreign Application Priority Data

Mar. 8, 2001    (JP)    .............................. 2001-064810

(51) Int. Cl.
*G06K 9/36*    (2006.01)

(52) U.S. Cl. ...................... 382/233; 382/251; 382/252; 375/240.27; 375/240.25; 375/240.16; 348/425.2

(58) Field of Classification Search ........ 382/123–233, 382/236, 240, 248, 252, 309, 287; 341/94, 341/50; 375/240.27, 240.26, 240.25, 240.16; 348/398.1, 416.1, 421.1, 425.2, 431.1; 358/3.05, 358/426.1, 426.01, 426
See application file for complete search history.

(56) References Cited

U.S. PATENT DOCUMENTS

| 5,212,549 | A | * | 5/1993 | Ng et al. ................ 375/240.15 |
| 5,699,117 | A | * | 12/1997 | Uramoto et al. ......... 348/390.1 |
| 5,854,799 | A | * | 12/1998 | Okada et al. ................ 714/781 |
| 6,018,592 | A | | 1/2000 | Shinagawa et al. |
| 6,046,784 | A | * | 4/2000 | Lee ........................ 375/240.27 |
| 6,072,831 | A | * | 6/2000 | Chen ....................... 375/240.03 |
| 6,137,910 | A | | 10/2000 | Shinagawa et al. |
| 6,434,319 | B1 | * | 8/2002 | Wine ........................... 386/46 |
| 6,445,742 | B1 | * | 9/2002 | Yoo et al. ............... 375/240.27 |
| 6,490,705 | B1 | * | 12/2002 | Boyce ......................... 714/776 |
| 6,507,618 | B1 | * | 1/2003 | Wee et al. ............. 375/240.16 |
| 6,704,363 | B1 | * | 3/2004 | Kim ....................... 375/240.27 |
| 6,862,372 | B1 | * | 3/2005 | Yang et al. ................. 382/254 |
| 2002/0037047 | A1 | * | 3/2002 | Van Der Schaar et al. ..................... 375/240.12 |
| 2002/0053546 | A1 | * | 5/2002 | Bedard ....................... 210/660 |

FOREIGN PATENT DOCUMENTS

JP          2004186858 A    *   7/2004

OTHER PUBLICATIONS

European Patent Office, European Search Report, Appl. No. 02 090 154.2-1247, Nov. 6, 2002, 4 pages.

(Continued)

*Primary Examiner*—Kanjibhai Patel
*Assistant Examiner*—Ali Bayat

(57) ABSTRACT

An image coding and decoding technology for digital movie or video that provides for error checking within the digital video files. The digital video is coded in a data stream that includes key frames and correspondence data between key frames as well as additional correspondence data between somewhat separated key frames. During decoding, an intermediate image generator generates an intermediate frame or frames by interpolation, based on key frame data and correspondence data file between key frames. If an error detector detects an error in an input coded data stream, an error controller instructs the intermediate image generator to perform an error avoidance processing which may include substituting another key frame for an error-containing key frame or use of the additional correspondence data to create the intermediate key frame or frames for an error-containing correspondence data file, and so forth.

25 Claims, 28 Drawing Sheets

OTHER PUBLICATIONS

European Patent Office, European Examination Report, Appl. No. 02 090 154.2-1247, Feb. 10, 2005, 6 pages.

Sun H et al: "Error concealment algorithms for robust decoding of MPEG compressed video" Signal Processing, Image Communication, Elsevier Science Publishers, Amsterdam, NL, vol. 10, No. 4, Sep. 1, 1997, pp. 249-268, XXP004091243 ISSN: 0923-5965.

"ITU-T Recommendation H.262, International Standard ISO/IEC 13818.2 MPEG-2 Video, Transmission of Non-Telephone Signals. Information Technology-Generic Coding of Moving Pictures and Associated Audio Information Video" ITU-T Telecommunication Standardization Sector of ITU, Geneva, CH, Jul. 1, 1995, pp. 1-211, XP000198491.

Hong M-C et al: "Error concealment algorithms for compressed video" Signal Processing: Image Communication, Elsevier Science Publishers, Amsterdam, NL vol. 14 No. 6-8 May 1999, pp. 473-492, XP004165389 ISSN: 0923-5965.

* cited by examiner p(m, s)

CBS

CBS

$C_{5,6}$ $KF_5$ $KF_6$ $$p \xrightarrow{f} q$$

where $$f(x) \equiv x$$

Fig.34

IMAGE CODING METHOD AND APPARATUS AND IMAGE DECODING METHOD AND APPARATUS

BACKGROUND OF THE INVENTION

1. Field of the Invention

The present invention relates to an image processing technology, and more particularly relates to an image coding and decoding method and apparatus therefor which takes error processing into consideration.

2. Description of the Related Art

Recently, image processing and compression methods such as those proposed by MPEG (Motion Picture Expert Group) have expanded to be used with transmission media such as network and broadcast rather than just storage media such as CDs. Generally speaking, the success of the digitization of broadcast materials has been caused at least in part by the availability of MPEG compression coding technology. In this way, a barrier that previously existed between broadcast and other types of communication has begun to disappear, leading to a diversification of service-providing businesses. Thus, we are facing a situation where it is hard to predict how the digital culture would evolve in this age of broadband.

Even in such a chaotic situation, it is clear that the direction of the compression technology of motion pictures will be to move to both higher compression rates and better image quality. It is a well-known fact that block distortion in MPEG compression is sometimes responsible for causing degraded image quality and preventing the compression rate from being improved. Another problem that occurs in compression algorithms is poor tolerance of errors. Unlike reading data from storage media, this is particularly an issue for transmission of data through networks such as the Internet in which data delivery can be subject to a greater number of errors.

SUMMARY OF THE INVENTION

The present invention has been made in view of the foregoing circumstances and an object thereof is to provide a new compression technology for motion pictures which also provides error tolerance.

In the following, an image decoding technology and an image coding technology according to the present invention are described primarily with regard to motion pictures. However, the use of the technology is not limited to motion pictures and includes other image processing, for example, image effects such as morphing and walkthrough.

A preferred embodiment according to the present invention relates to an image decoding apparatus. First, for nonnegative integers i and j, when data of an i-th key frame and a j-th key frame are defined as $KF_i$ and $KF_j$, respectively, a correspondence data file between the i-th key frame and the j-th key frame is defined as $C_{i,j}$, and data of an intermediate frame between the i-th key frame and the j-th key frame is defined as $IF_{i,j}$. Now, the image decoding apparatus includes: an error detector which receives a data stream that includes $KF_i$, $KF_{i+1}$ and $C_{i,i+1}$ and which detects whether or nor there is an error in the data stream; an intermediate image generator which generates $IF_{i,i+1}$ from the data stream; and an error controller which, when an error occurs in the data stream, controls said intermediate image generator in a manner such that an error avoidance processing is performed in the intermediate image generator. Hereinafter, the term "frame", which is a unit of image, will not be distinguished from the term "image" unless otherwise necessary. Further, the term "error" indicates a data error and other arbitrary faults and obstruction.

The intermediate image generator may generate $IF_{i,j}$ by interpolating using $C_{i,j}$, $KF_i$ and $KF_j$. $IF_{i,j}$ may correspond to an arbitrary frame between $KF_i$ and $KF_j$, and, in that sense, $IF_{i,j}$ representatively symbolizes all intermediate frames that may be generated between $KF_i$ and $KF_j$.

Another preferred embodiment according to the present invention relates to an image decoding method. This method includes: acquiring a data stream that includes a plurality of key frames and a correspondence data file therebetween; generating an intermediate frame between the key frames from the data stream; and monitoring for an error in the data stream, wherein, when an error is detected, an error avoidance processing is performed at the time of generating the intermediate frame.

In the above apparatus and method, there may be several types of error avoidance processing, depending on where the error occurs, for example, as follows:

1. The intermediate frame is generated from data of another key frame which is substituted for data of the error-containing key frame.
2. The intermediate frame is generated based on data of another key frame and a correspondence data file relating thereto.
3. The intermediate frame is generated from another correspondence data file which is substituted for the error-containing correspondence data file.
4. The intermediate frame is generated based on a new correspondence data file generated based on another correspondence data file.

Moreover, when it is judged that a seriousness of the error is below a predetermined level, the error avoidance processing may be abandoned. Situations in which the serious of the error is low may include the following examples:

1. In all pixels of a key frame, the total number of error-containing pixels is low.
2. In the image of a key frame, the error is not present or substantially less in the low frequency component thereof.
3. Even though there are a plurality of error-containing pixels or areas, they are relatively dispersed.
4. The error-containing area is close to the edge of an image.
5. The error-containing area is in the background of an object and so forth, thus being inconspicuous.
6. The intensity of an error-containing pixel or area is low.

Still another preferred embodiment according to the present invention relates to an image coding apparatus. The image coding apparatus includes: an image input unit which receives data of key frames; a correspondence data generator which generates $C_{i,i+1}$ by utilizing $KF_i$ and $KF_{i+1}$, and generates $C_{i,j}$ by utilizing $KF_i$ and $KF_j$, where j>i+1, among the input key frame data; and a stream generator which generates a data stream including data generated by the correspondence data generator.

Still another preferred embodiment according to the present invention relates to an image coding method. The image coding method includes: first generating, based on data of two adjacent key frames, correspondence data therebetween; second generating, based on data of key frames disposed at some interval, correspondence data therebetween; and generating a data stream in a manner such that the correspondence data generated in said first generating serves as main data and the correspondence data generated in said second generating serves as spare data.

Here, the term "main data" indicates data to be reproduced in a usual manner while the term "spare data"

indicates data to be used for repairing an error which has occurred at the time of decoding processing. Thus, the second generating may be executed with lower frequency than execution of the first generating. Moreover, in the present method, the correspondence data may be generated in a manner such that data for checking for errors is embedded therein. An example of a type of error checking data is a parity bit which is inserted into the correspondence data.

The image coding method according to the present invention may further include, when generating the correspondence data, an image matching which includes: multiresolutionalizing two key frames by respectively extracting critical points; performing, for example, a pixel-by-pixel matching computation on those key frames between similar multiresolution levels; and acquiring a pixel-by-pixel correspondence relation at a finest level of resolution while inheriting a result of the pixel-by-pixel matching computation at a different multiresolution level.

In the above-described embodiments, the matching method that utilizes critical points may be an application of the technology (referred to as the "base technology" hereinafter) proposed by Japanese Patent No. 2927350 which is owned by the same assignee as the present patent specification.

It is to be noted that it is also possible to have replacement or substitution of the above-described structural components and elements of methods in part or whole as between method and apparatus or to add elements to either method or apparatus and also, the apparatuses and methods may be implemented by a computer program and saved on a recording medium or the like and are all effective as and encompassed by the present invention.

Moreover, this summary of the invention includes features that may not be necessary features such that an embodiment of the present invention may also be a subcombination of these described features.

BRIEF DESCRIPTION OF THE DRAWINGS

FIG. 9 is a diagram showing correspondence between partial images of the m-th and (m−1)th levels of resolution.

corresponding to $f^{(m,s)}$ ($\lambda=i\Delta\lambda$) which has been obtained for a certain $f^{(m,s)}$ while varying $\lambda$.

Figure 17:
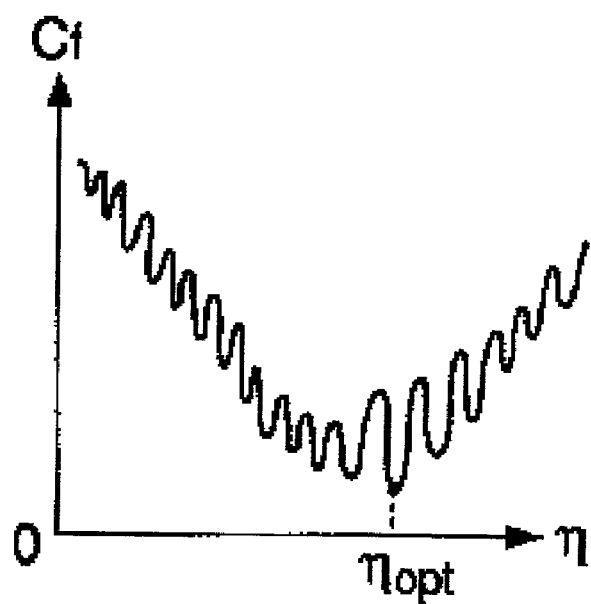

FIG. 17 is a diagram showing the behavior of energy $$C_f^{(n)}$$

corresponding to $f^{(n)}$ ($\eta=i\Delta\eta$)(i=0,1, . . . ) which has been obtained while varying η.

Figure 18:
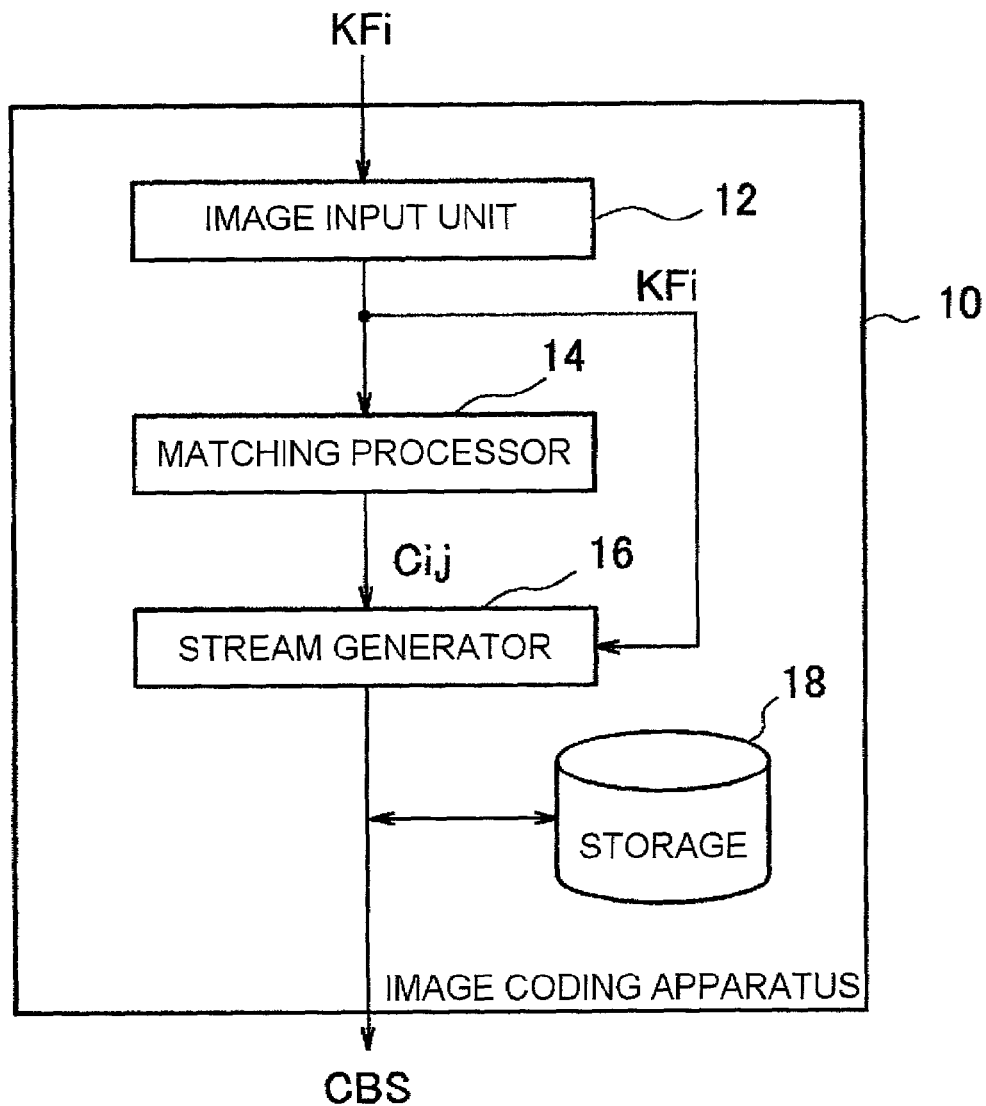

FIG. 18 shows a structure of an image coding apparatus according to an embodiment of the invention.

Figure 19:
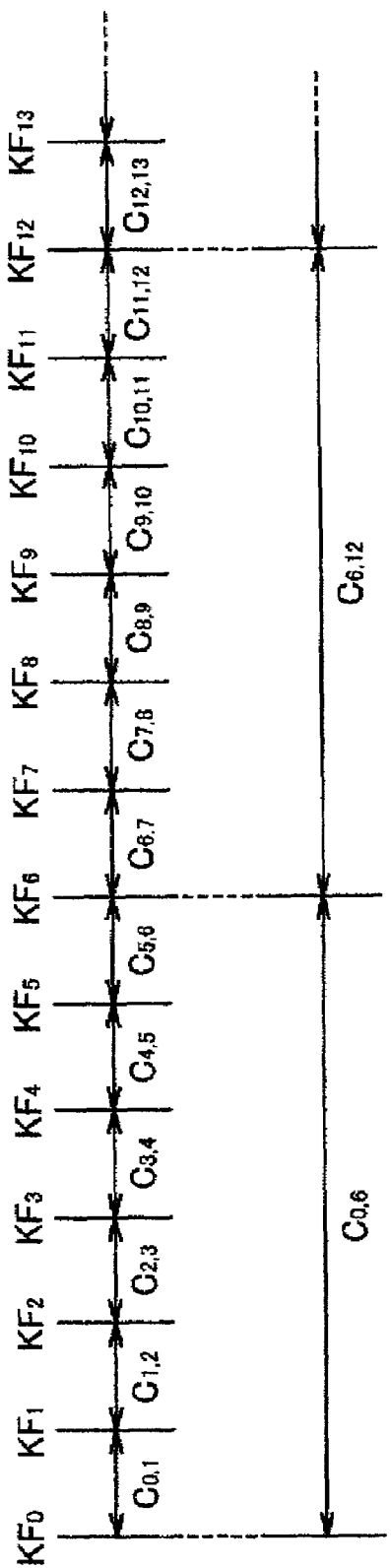

FIG. 19 shows a relationship between a main file and a spare file generated by a matching processor.

Figure 20:
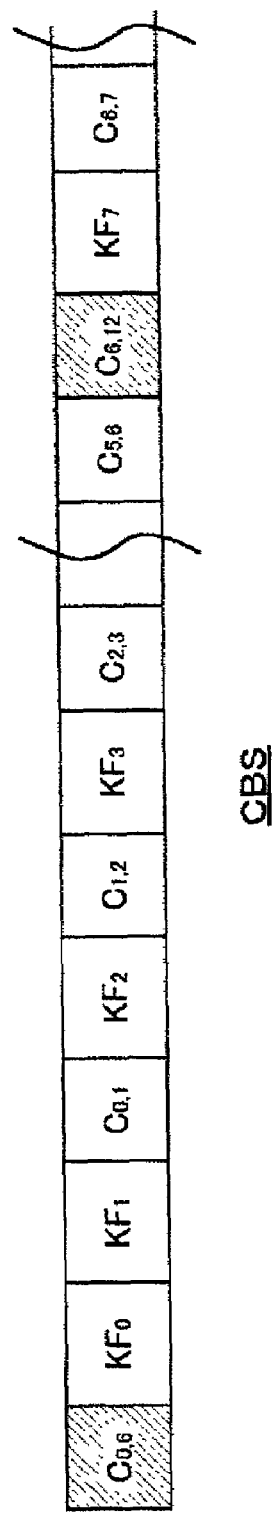

FIG. 20 shows a structure of a data stream generated by a stream generator.

Figure 21:
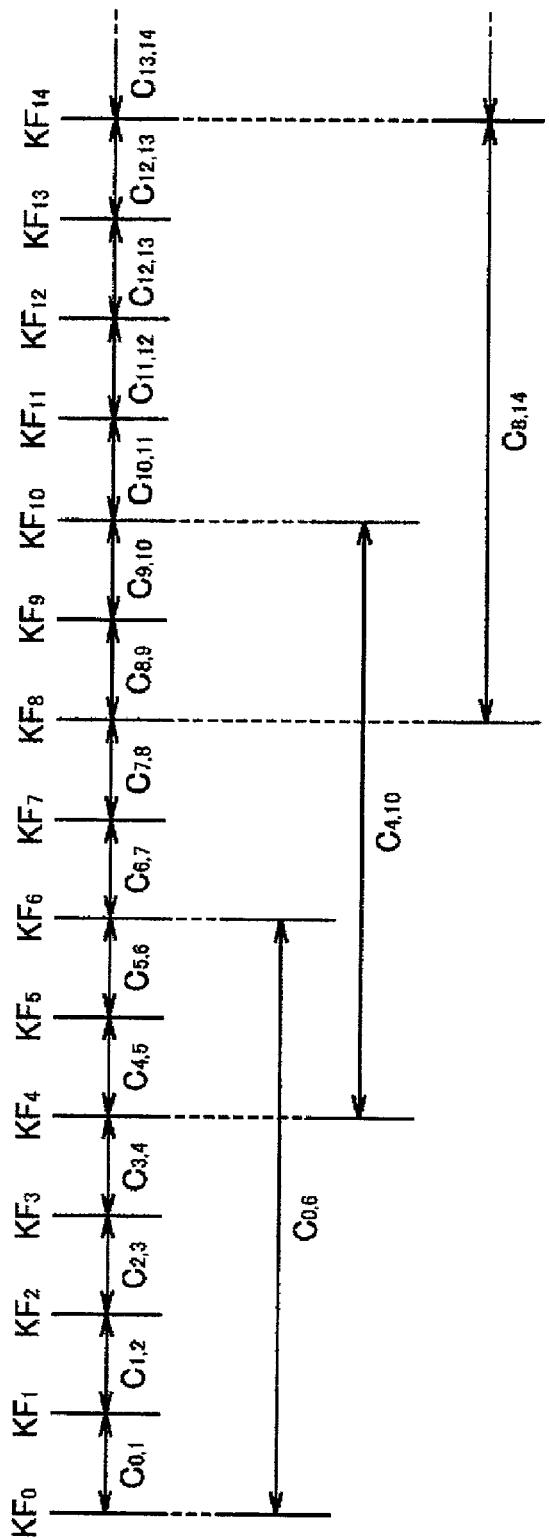

FIG. 21 shows another relationship between a main file and a spare file.

Figure 22:
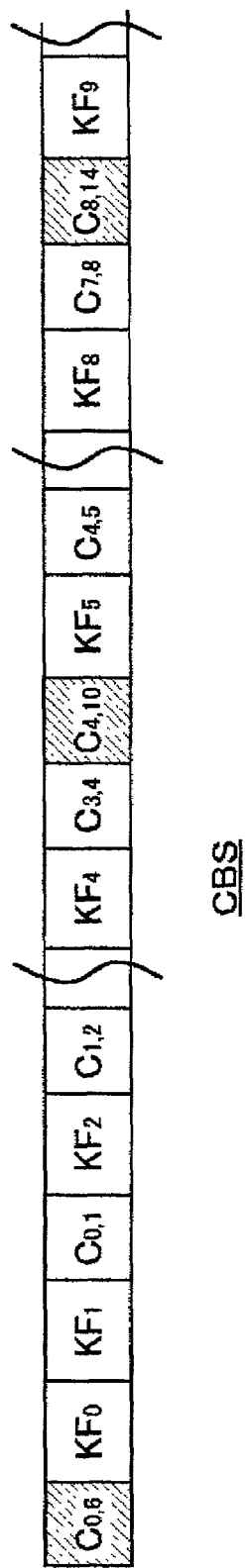

FIG. 22 shows another structure of a data stream generated by the stream generator.

Figure 23:
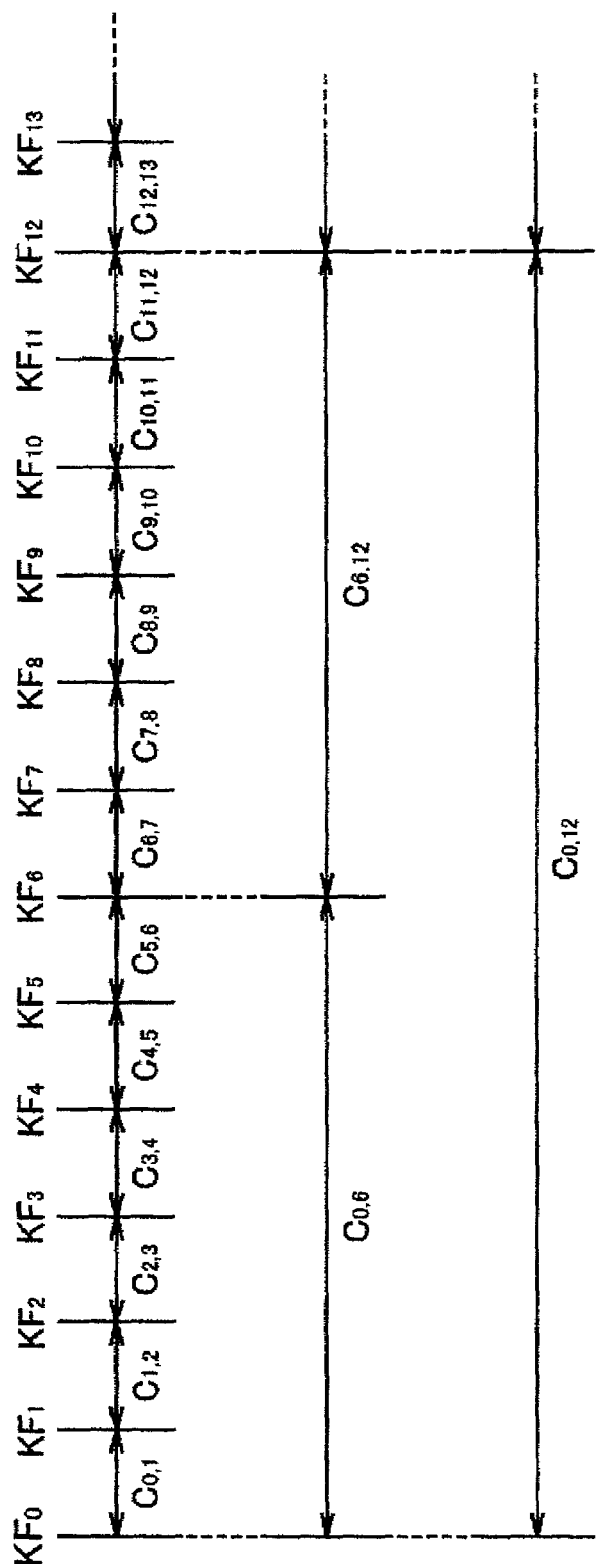

FIG. 23 shows still another relationship between a main file and a spare file.

Figure 24:
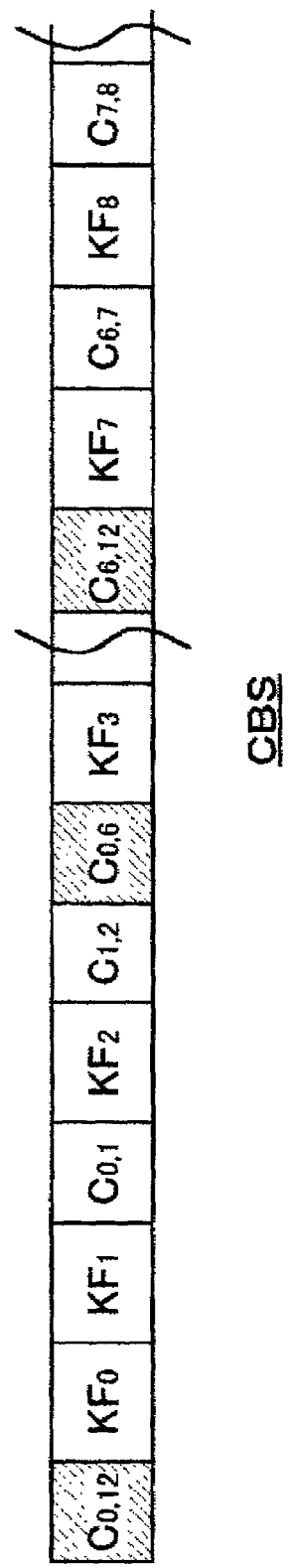

FIG. 24 shows still another structure of a data stream generated by the stream generator.

Figures 25, 26:
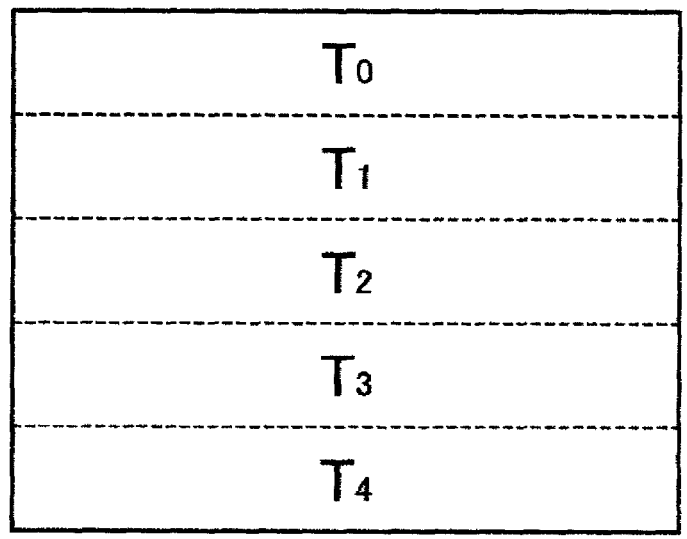

FIG. 25 shows an area of a key frame which may be used for checking for any errors during decoding.

FIG. 26 shows an area of a correspondence data file which may be used for checking for any errors during decoding.

Figure 27:
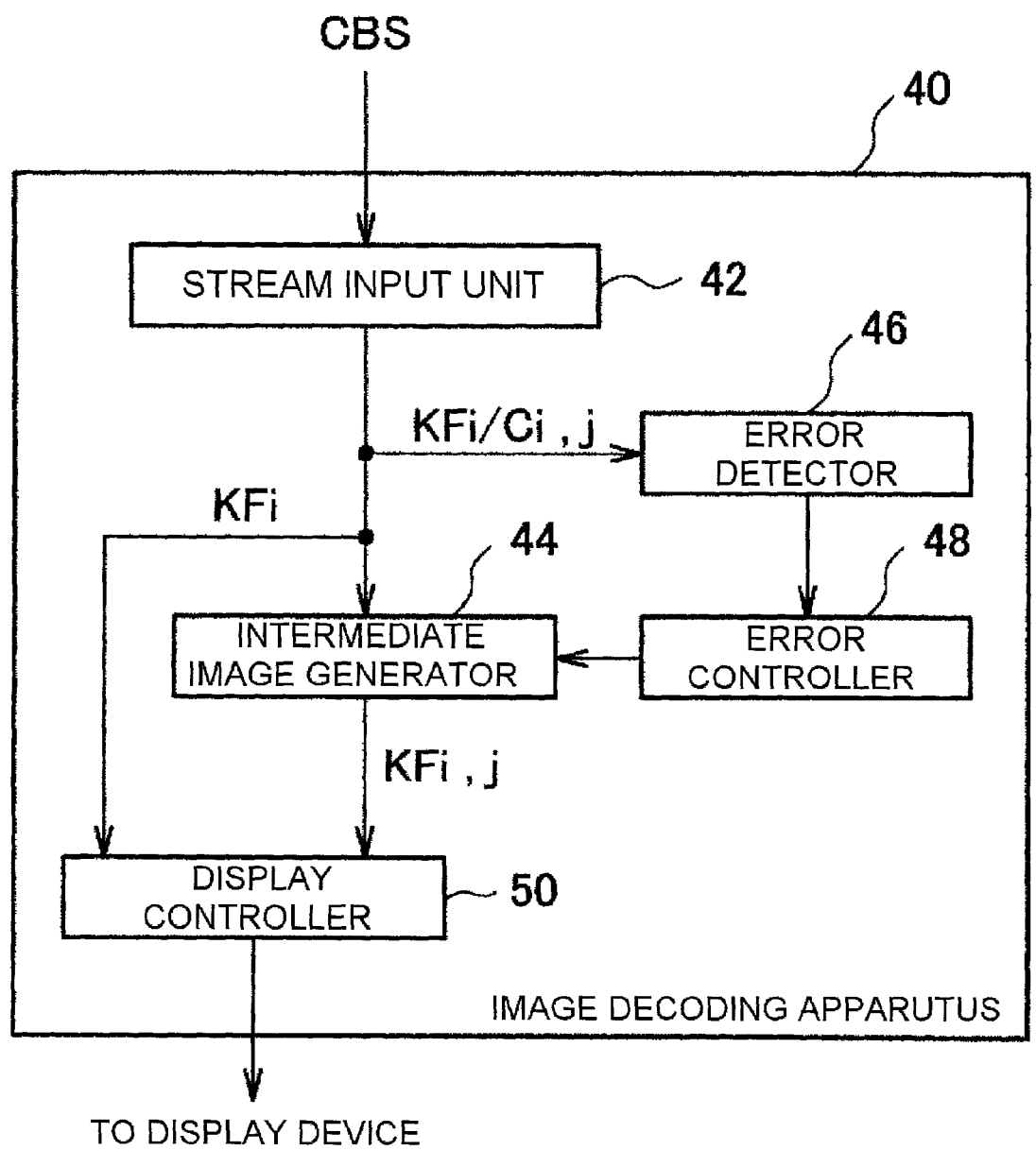

FIG. 27 shows a structure of an image decoding apparatus according to an embodiment of the invention.

Figure 28:
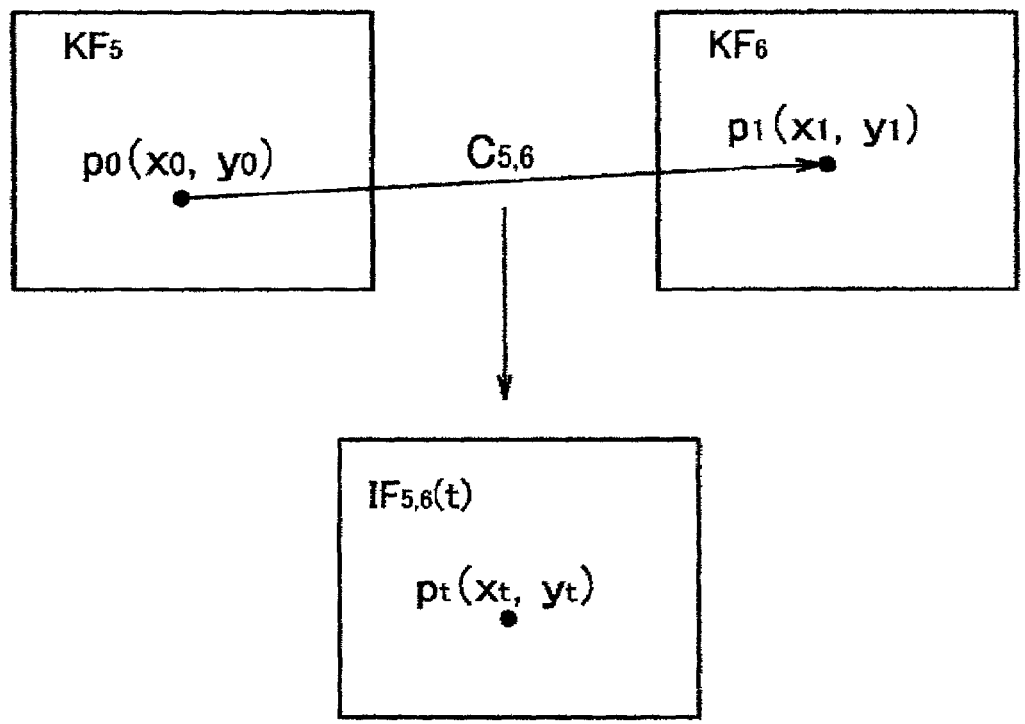

FIG. 28 shows a principle of generation of intermediate frames by an intermediate image generator.

Figure 29:
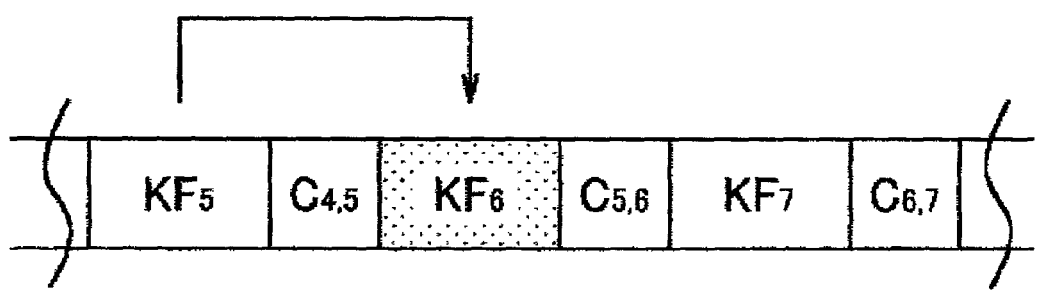

FIG. 29 shows an error avoidance processing performed when an error is detected in a key frame.

Figure 30:
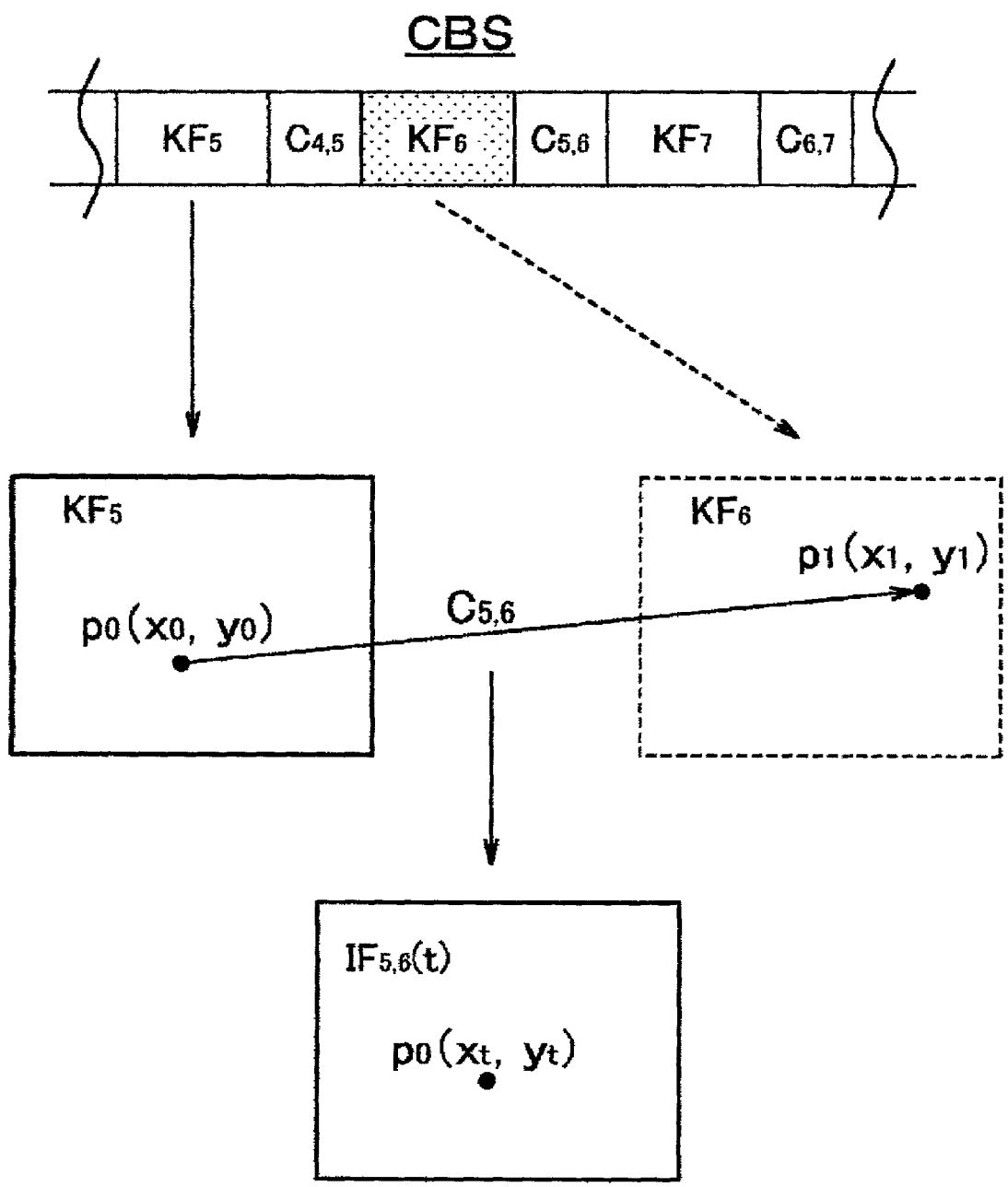

FIG. 30 shows another error avoidance processing performed when an error is detected in a key frame.

Figure 31:
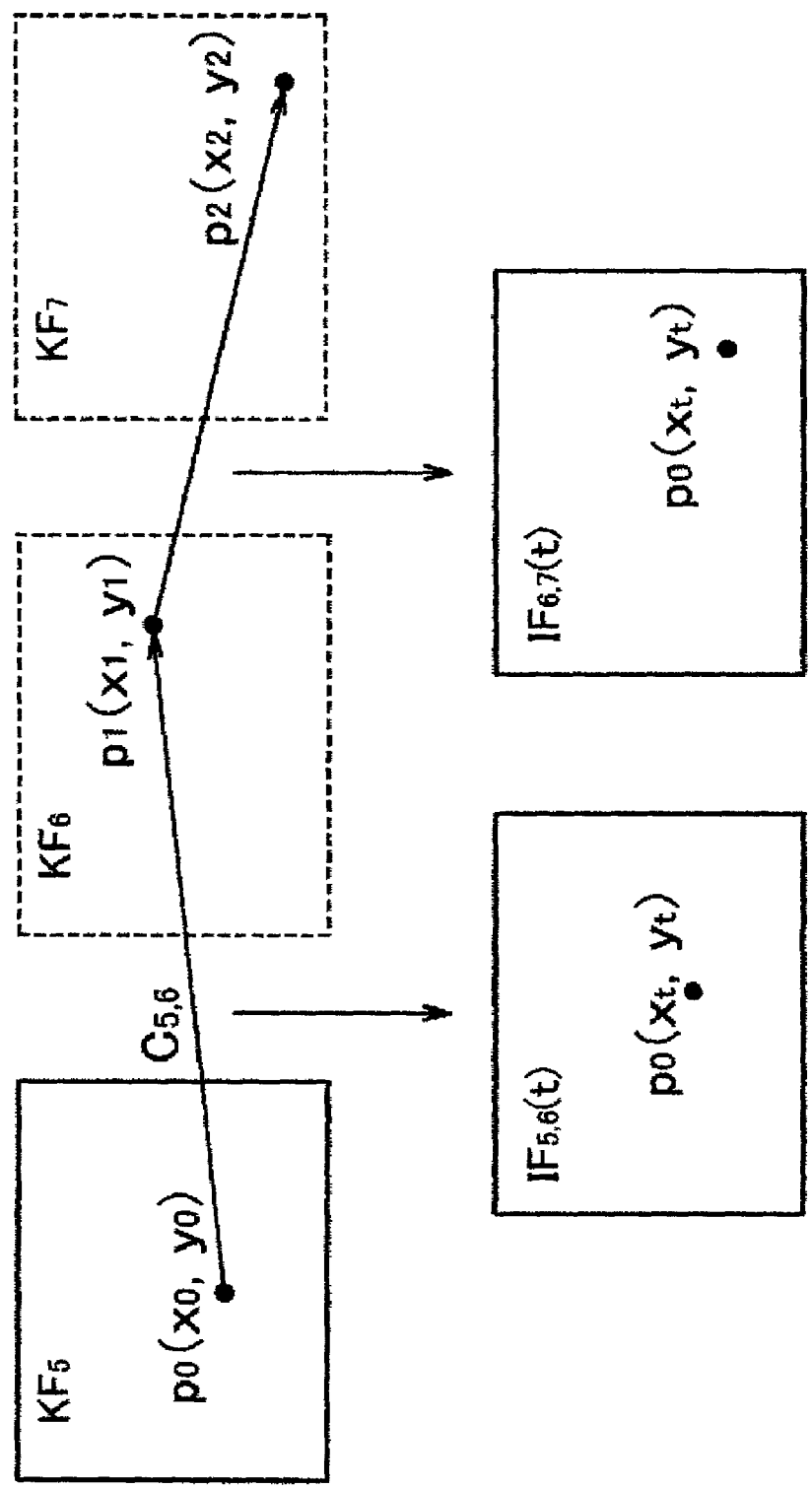

FIG. 31 shows an error avoidance processing performed when errors are detected in key frames.

Figure 32:
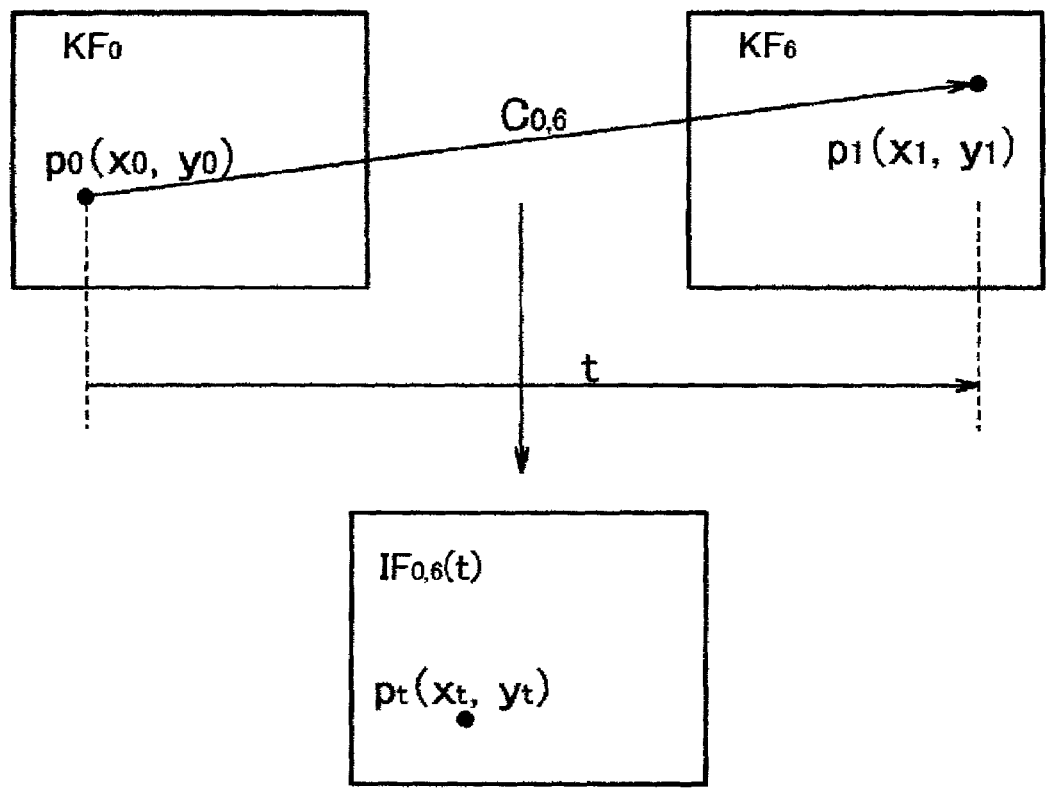

FIG. 32 shows still another error avoidance processing performed when an error is detected in a key frame.

Figure 33:
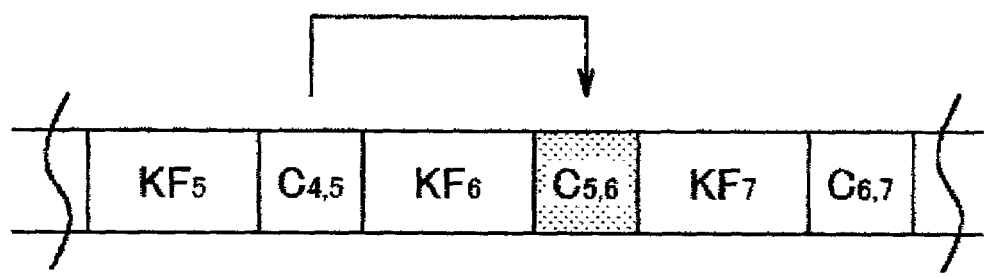

FIG. 33 shows an error avoidance processing performed when an error is detected in a correspondence data file.

FIG. 34 shows another error avoidance processing performed when an error is detected in a correspondence data file.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

First, the multiresolutional critical point filter technology and the image matching processing using the technology, both of which will be utilized in the preferred embodiments, will be described in detail as "Base Technology". Namely, the following sections [1] and [2] (below) belong to the base technology, where section [1] describes elemental techniques and section [2] describes a processing procedure. These techniques are patented under Japanese Patent No. 2927350 and owned by the same assignee of the present invention. However, it is to be noted that the image matching techniques provided in the present embodiments are not limited to the same levels. In particular, In FIGS. 18 to 34, image data coding and decoding techniques utilizing, in part, the base technology will be described in more detail.

Base Technology

[1] Detailed Description of Elemental Techniques

[1.1] Introduction

Using a set of new multiresolutional filters called critical point filters, image matching is accurately computed. There is no need for any prior knowledge concerning the content of the images or objects in question. The matching of the images is computed at each resolution while proceeding through the resolution hierarchy. The resolution hierarchy proceeds from a coarse level to a fine level. Parameters necessary for the computation are set completely automatically by dynamical computation analogous to human visual systems. Thus, There is no need to manually specify the correspondence of points between the images.

The base technology can be applied to, for instance, completely automated morphing, object recognition, stereo photogrammetry, volume rendering, and smooth generation of motion images from a small number of frames. When applied to morphing, given images can be automatically transformed. When applied to volume rendering, intermediate images between cross sections can be accurately reconstructed, even when a distance between cross sections is rather large and the cross sections vary widely in shape.

[1.2] The Hierarchy of the Critical Point Filters

The multiresolutional filters according to the base technology preserve the intensity and location of each critical point included in the images while reducing the resolution. Initially, let the width of an image to be examined be N and the height of the image be M. For simplicity, assume that $N=M=2^n$ where n is a positive integer. An interval $[0, N] \subset R$ is denoted by I. A pixel of the image at position (i, j) is denoted by $p^{(i,j)}$ where $i,j \in I$.

Here, a multiresolutional hierarchy is introduced. Hierarchized image groups are produced by a multiresolutional filter. The multiresolutional filter carries out a two dimensional search on an original image and detects critical points therefrom. The multiresolutional filter then extracts the critical points from the original image to construct another image having a lower resolution. Here, the size of each of the respective images of the m-th level is denoted as $2^m \times 2^m$ ($0 \leq m \leq n$) A critical point filter constructs the following four new hierarchical images recursively, in the direction descending from n.

$$p_{(i,j)}^{(m,0)} = \min(\min(p_{(2i,2j)}^{(m+1,0)}, p_{(2i,2j+1)}^{(m+1,0)}), \min(p_{(2i+1,2j)}^{(m+1,0)}, p_{(2i+1,2j+1)}^{(m+1,0)})) \quad (1)$$

$$p_{(i,j)}^{(m,1)} = \max(\min(p_{(2i,2j)}^{(m+1,1)}, p_{(2i,2j+1)}^{(m+1,1)}), \min(p_{(2i+1,2j)}^{(m+1,1)}, p_{(2i+1,2j+1)}^{(m+1,1)}))$$

$$p_{(i,j)}^{(m,2)} = \min(\max(p_{(2i,2j)}^{(m+1,2)}, p_{(2i,2j+1)}^{(m+1,2)}), \max(p_{(2i+1,2j)}^{(m+1,2)}, p_{(2i+1,2j+1)}^{(m+1,2)}))$$

$$p_{(i,j)}^{(m,3)} = \max(\max(p_{(2i,2j)}^{(m+1,3)}, p_{(2i,2j+1)}^{(m+1,3)}), \max(p_{(2i+1,2j)}^{(m+1,3)}, p_{(2i+1,2j+1)}^{(m+1,3)}))$$

where we let $$p_{(i,j)}^{(n,0)} = p_{(i,j)}^{(n,1)} = p_{(i,j)}^{(n,2)} = p_{(i,j)}^{(n,3)} = p_{(i,j)} \quad (2)$$

The above four images are referred to as subimages hereinafter. When $\min_{x \leq t \leq x+1}$ and $\max_{x \leq t \leq x+1}$ are abbreviated to $\alpha$ and $\beta$, respectively, the subimages can be expressed as follows:

$$P^{(m,0)} = \alpha(x)\alpha(y)p^{(m+1,0)}$$

$$P^{(m,1)} = \alpha(x)\beta(y)p^{(m+1,1)}$$

$$P^{(m,2)} = \beta(x)\alpha(y)p^{(m+1,2)}$$

$$P^{(m,2)} = \beta(x)\beta(y)p^{(m+1,3)}$$

Namely, they can be considered analogous to the tensor products of $\alpha$ and $\beta$. The subimages correspond to the respective critical points. As is apparent from the above equations, the critical point filter detects a critical point of the original image for every block consisting of 2×2 pixels. In this detection, a point having a maximum pixel value and a point having a minimum pixel value are searched with respect to two directions, namely, vertical and horizontal directions, in each block. Although pixel intensity is used as a pixel value in this base technology, various other values relating to the image may be used. A pixel having the maximum pixel values for the two directions, one having minimum pixel values for the two directions, and one having a minimum pixel value for one direction and a maximum pixel value for the other direction are detected as a local maximum point, a local minimum point, and a saddle point, respectively.

By using the critical point filter, an image (1 pixel here) of a critical point detected inside each of the respective blocks serves to represent its block image (4 pixels here) in the next lower resolution level. Thus, the resolution of the image is reduced. From a singularity theoretical point of view, $\alpha(x)\alpha(y)$ preserves the local minimum point (minima point), $\beta(x)\beta(y)$ preserves the local maximum point (maxima point), $\alpha(x)\beta(y)$ and $\beta(x)\alpha(y)$ preserve the saddle points.

At the beginning, a critical point filtering process is applied separately to a source image and a destination image which are to be matching-computed. Thus, a series of image groups, namely, source hierarchical images and destination hierarchical images are generated. Four source hierarchical images and four destination hierarchical images are generated corresponding to the types of the critical points.

Thereafter, the source hierarchical images and the destination hierarchical images are matched in a series of resolution levels. First, the minima points are matched using $p^{(m,0)}$. Next, the first saddle points are matched using $p^{(m,1)}$ based on the previous matching result for the minima points. The second saddle points are matched using $p^{(m,2)}$. Finally, the maxima points are matched using $p^{(m,3)}$.

Figure 1A:
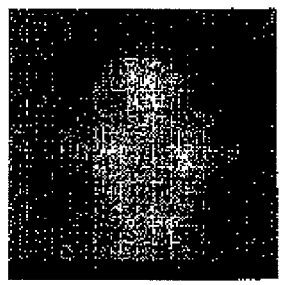
FIG. 1(a) is an image obtained as a result of the application of an averaging filter to a human facial image.
Figure 1B:
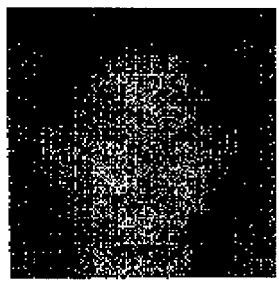
FIG. 1(b) is an image obtained as a result of the application of an averaging filter to another human facial image.
Figure 1C:
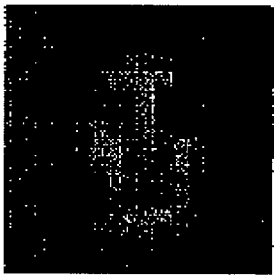
FIG. 1(c) is an image of a human face at $p^{(5,0)}$ obtained in a preferred embodiment in the base technology.
Figure 1D:
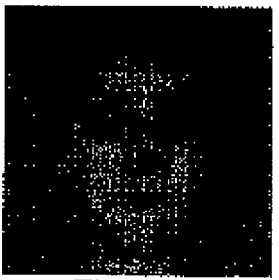
FIG. 1(d) is another image of a human face at $p^{(5,0)}$ obtained in a preferred embodiment in the base technology.
Figure 1E:
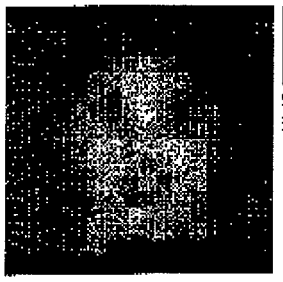
FIG. 1(e) is an image of a human face at $p^{(5,1)}$ obtained in a preferred embodiment in the base technology.
Figure 1F:
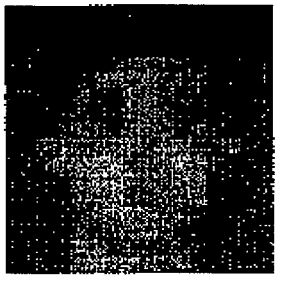
FIG. 1(f) is another image of a human face at $p^{(5,1)}$ obtained in a preferred embodiment in the base technology.
Figure 1G:
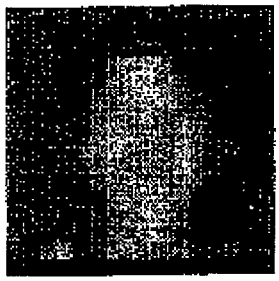
FIG. 1(g) is an image of a human face at $p^{(5,2)}$ obtained in a preferred embodiment in the base technology.
Figure 1H:
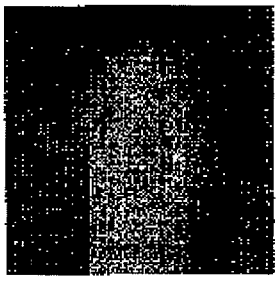
FIG. 1(h) is another image of a human face at $p^{(5,2)}$ obtained in a preferred embodiment in the base technology.
Figure 1I:
FIG. 1(i) is an image of a human face at $p^{(5,3)}$ obtained in a preferred embodiment in the base technology.
Figure 1J:
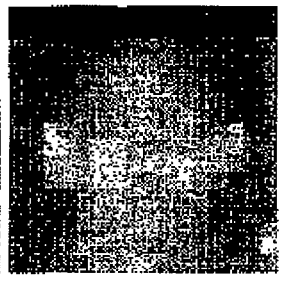
FIG. 1(j) is another image of a human face at $p^{(5,3)}$ obtained in a preferred embodiment in the base technology.

FIGS. 1c and 1d show the subimages $p^{(5,0)}$ of the images in FIGS. 1a and 1b, respectively. Similarly, FIGS. 1e and 1f show the subimages $p^{(5,1)}$, FIGS. 1g and 1h show the subimages $p^{(5,2)}$, and FIGS. 1i and 1j show the subimages $p^{(5,3)}$. Characteristic parts in the images can be easily matched using subimages. The eyes can be matched by $p^{(5,0)}$ since the eyes are the minima points of pixel intensity in a face. The mouths can be matched by $p^{(5,1)}$ since the mouths have low intensity in the horizontal direction. Vertical lines on both sides of the necks become clear by $p^{(5,2)}$. The ears and bright parts of the cheeks become clear by $p^{(5,3)}$ since these are the maxima points of pixel intensity.

As described above, the characteristics of an image can be extracted by the critical point filter. Thus, by comparing, for example, the characteristics of an image shot by a camera with the characteristics of several objects recorded in advance, an object shot by the camera can be identified.

[1.3] Computation of Mapping Between Images

Now, for matching images, a pixel of the source image at the location (i,j) is denoted by $$p^{(n)}_{(i,j)}$$

and that of the destination image at (k,l) is denoted by $$q^{(n)}_{(k,l)}$$

where i, j, k, l∈I. The energy of the mapping between the images (described later in more detail) is then defined. This energy is determined by the difference in the intensity of the pixel of the source image and its corresponding pixel of the destination image and the smoothness of the mapping. First, the mapping $f^{(m,0)}:p^{(m,0)} \to q^{(m,0)}$ between $p^{(m,0)}$ and $q^{(m,0)}$ with the minimum energy is computed. Based on $f^{(m,0)}$ the mapping $f^{(m,1)}$ between $p^{(m,1)}$ and $q^{(m,1)}$ with the minimum energy is computed. This process continues until $f^{(m,3)}$ between $p^{(m,3)}$ and $q^{(m,3)}$ is computed. Each $f^{(m,i)}$ (i=0,1, 2, . . . ) is referred to as a submapping. The order of i will be rearranged as shown in the following equation (3) in computing $f^{(m,i)}$ for reasons to be described later.

$$f^{(m,i)}:p^{(m,\sigma(i))} \to q^{(m,\sigma(i))} \quad (3)$$

where σ (i)∈{0,1,2,3}.

[1. 3. 1] Bijectivity

When the matching between a source image and a destination image is expressed by means of a mapping, that mapping shall satisfy the Bijectivity Conditions (BC) between the two images (note that a one-to-one surjective mapping is called a bijection). This is because the respective images should be connected satisfying both surjection and injection, and there is no conceptual supremacy existing between these images. It is to be noted that the mappings to be constructed here are the digital version of the bijection. In the base technology, a pixel is specified by a co-ordinate point.

The mapping of the source subimage (a subimage of a source image) to the destination subimage (a subimage of a destination image) is represented by $f^{(m,s)}: I/2^{n-m} \times I/2^{n-m} \to I/2^{n-m} \times I/2^{n-m}$ (s=0,1, . . . ), where $$f^{(m,s)}_{(i,j)} = (k, l)$$

means that $$p^{(m,s)}_{(i,j)}$$

of the source image is mapped to $$q^{(m,s)}_{(k,l)}$$

of the destination image. For simplicity, when f(i,j)=(k,l) holds, a pixel $q_{(k,l)}$ is denoted by $q_{f(i,j)}$.

When the data sets are discrete as image pixels (grid points) treated in the base technology, the definition of bijectivity is important. Here, the bijection will be defined in the following manner, where i, j, k and l are all integers. First, a square region R defined on the source image plane is considered $$p^{(m,s)}_{(i,j)} p^{(m,s)}_{(i+1,j)} p^{(m,s)}_{(i+1,j+1)} p^{(m,s)}_{(i,j+1)} \quad (4)$$

where i=0, . . . , $2^m-1$, and j=0, . . . , $2^m-1$. The edges of R are directed as follows:

$$\overrightarrow{p^{(m,s)}_{(i,j)} p^{(m,s)}_{(i+1,j)}}, \overrightarrow{p^{(m,s)}_{(i+1,j)} p^{(m,s)}_{(i+1,j+1)}}, \overrightarrow{p^{(m,s)}_{(i+1,j+1)} p^{(m,s)}_{(i,j+1)}} \text{ and } \overrightarrow{p^{(m,s)}_{(i,j+1)} p^{(m,s)}_{(i,j)}} \quad (5)$$

This square region R will be mapped by f to a quadrilateral on the destination image plane:

$$q^{(m,s)}_{f(i,j)} q^{(m,s)}_{f(i+1,j)} q^{(m,s)}_{f(i+1,j+1)} q^{(m,s)}_{f(i,j+1)} \quad (6)$$

This mapping $f^{(m,s)}(R)$, that is, $$f^{(m,s)}(R) = f^{(m,s)}(p^{(m,s)}_{(i,j)} p^{(m,s)}_{(i+1,j)} p^{(m,s)}_{(i+1,j+1)} p^{(m,s)}_{(i,j+1)}) = q^{(m,s)}_{f(i,j)} q^{(m,s)}_{f(i+1,j)} q^{(m,s)}_{f(i+1,j+1)} q^{(m,s)}_{f(i,j+1)}$$

should satisfy the following bijectivity conditions (referred to as BC hereinafter):
1. The edges of the quadrilateral $f^{(m,s)}(R)$ should not intersect one another.
2. The orientation of the edges of $f^{(m,s)}(R)$ should be the same as that of R (clockwise in the case shown in FIG. 2, described below).
3. As a relaxed condition, a retraction mapping is allowed.

Figure 2R:
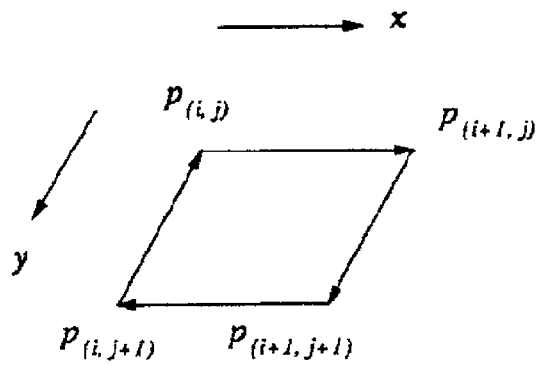
FIG. 2(R) shows an original quadrilateral.
Figure 2A:
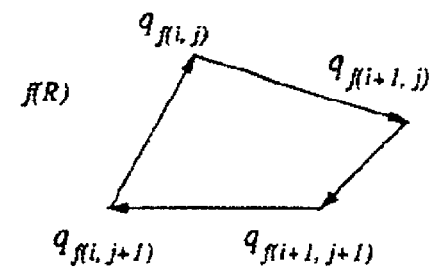
FIG. 2(A) shows an inherited quadrilateral.
Figure 2E:
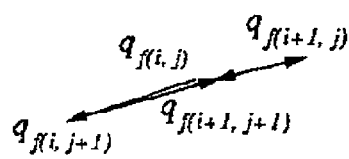
FIG. 2(E) shows an inherited quadrilateral.
Figure 2B:
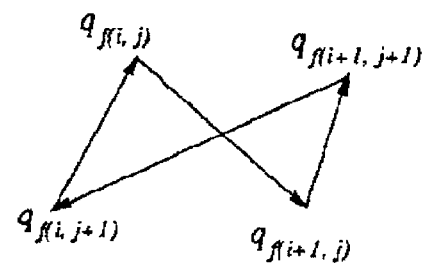
FIG. 2(B) shows an inherited quadrilateral.
Figure 2D:
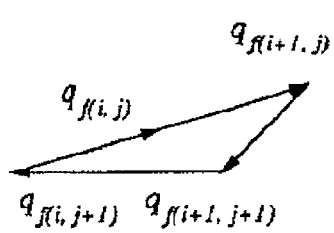
FIG. 2(D) shows an inherited quadrilateral.
Figure 2C:
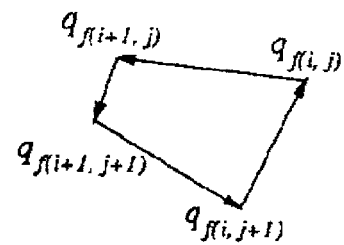
FIG. 2(C) shows an inherited quadrilateral.

Without a certain type of a relaxed condition as in, for example, condition 3 above, there would be no mappings which completely satisfy the BC other than a trivial identity mapping. Here, the length of a single edge of $f^{(m,s)}(R)$ may be zero. Namely, $f^{(m,s)}(R)$ may be a triangle. However, $f^{(m,s)}(R)$ is not allowed to be a point or a line segment having area zero. Specifically speaking, if FIG. 2R is the original quadrilateral, FIGS. 2A and 2D satisfy the BC while FIGS. 2B, 2C and 2E do not satisfy the BC.

In actual implementation, the following condition may be further imposed to easily guarantee that the mapping is surjective. Namely, each pixel on the boundary of the source image is mapped to the pixel that occupies the same location at the destination image. In other words, f(i,j)=(i,j) (on the four lines of i=0, i=$2^m$−1, j=0, j=$2^m$−1). This condition will be hereinafter referred to as an additional condition.

[1. 3. 2] Energy of Mapping

[1. 3. 2. 1] Cost Related to the Pixel Intensity

The energy of the mapping f is defined. An objective here is to search a mapping whose energy becomes minimum. The energy is determined mainly by the difference in the intensity between the pixel of the source image and its corresponding pixel of the destination image. Namely, the energy $$C^{(m,s)}_{(i,j)}$$

of the mapping $f^{(m,s)}$ at (i,j) is determined by the following equation (7).

$$C^{(m,s)}_{(i,j)} = |V(p^{(m,s)}_{(i,j)}) - V(q^{(m,s)}_{f(i,j)})|^2 \quad (7)$$

where $$V(p^{(m,s)}_{(i,j)}) \text{ and } V(q^{(m,s)}_{f(i,j)})$$

are the intensity values of the pixels $$p^{(m,s)}_{(i,j)} \text{ and } q^{(m,s)}_{f(i,j)},$$

respectively. The total energy $C^{(m,s)}$ of f is a matching evaluation equation, and can be defined as the sum of $$C^{(m,s)}_{(i,j)}$$

as shown in the following equation (8).

$$C^{(m,s)}_f = \sum_{i=0}^{i=2^m-1} \sum_{j=0}^{j=2^m-1} C^{(m,s)}_{(i,j)} \quad (8)$$

[1. 3. 2. 2] Cost Related to the Locations of the Pixel for Smooth Mapping

In order to obtain smooth mappings, another energy $D_f$ for the mapping is introduced. The energy $D_f$ is determined by the locations of $$p^{(m,s)}_{(i,j)} \text{ and } q^{(m,s)}_{f(i,j)}$$

(i=0,1, ... ,$2^m$−1, j=0,1, ... ,$2^m$−1), regardless of the intensity of the pixels. The energy $$D^{(m,s)}_{(i,j)}$$

of the mapping $f^{(m,s)}$ at a point (i,j) is determined by the following equation (9).

$$D^{(m,s)}_{(i,j)} = \eta E^{(m,s)}_{0(i,j)} + E^{(m,s)}_{1(i,j)} \quad (9)$$

where the coefficient parameter η which is equal to or greater than 0 is a real number. And we have $$E^{(m,s)}_{0(i,j)} = \|(i, j) - f^{(m,s)}(i, j)\|^2 \quad (10)$$

$$E^{(m,s)}_{1(i,j)} = \sum_{i'=i-1}^{i} \sum_{j'=j-1}^{j} \|(f^{(m,s)}(i, j) - (i, j)) - (f^{(m,s)}(i', j') - (i', j'))\|^2 / 4 \quad (11)$$

where $$\|(x, y)\| = \sqrt{x^2 + y^2}, \quad (12)$$

i' and j' are integers and f(i',j') is defined to be zero for i'<0 and j'<0. $E_0$ is determined by the distance between (i,j) and f(i,j). $E_0$ prevents a pixel from being mapped to a pixel too far away from it. However, as explained below, $E_0$ can be replaced by another energy function. $E_1$ ensures the smoothness of the mapping. $E_1$ represents a distance between the displacement of p(i,j) and the displacement of its neighboring points. Based on the above consideration, another evaluation equation for evaluating the matching, or the energy $D_f$ is determined by the following equation:

$$D_f^{(m,s)} = \sum_{i=0}^{i=2^m-1} \sum_{j=0}^{j=2^m-1} D_{(i,j)}^{(m,s)} \quad (13)$$

[1. 3. 2. 3] Total Energy of the Mapping

The total energy of the mapping, that is, a combined evaluation equation which relates to the combination of a plurality of evaluations, is defined as $$\lambda C_f^{(m,s)} + D_f^{(m,s)},$$

where $\lambda \geq 0$ is a real number. The goal is to detect a state in which the combined evaluation equation has an extreme value, namely, to find a mapping which gives the minimum energy expressed by the following:

$$\min_f \{\lambda C_f^{(m,s)} + D_f^{(m,s)}\} \quad (14)$$

Care must be exercised in that the mapping becomes an identity mapping if $\lambda=0$ and $\eta=0$ (i.e., $f^{(m,s)}(i,j)=(i,j)$ for all $i=0,1,\ldots,2^m-1$ and $j=0,1,\ldots,2^m-1$). As will be described later, the mapping can be gradually modified or transformed from an identity mapping since the case of $\lambda=0$ and $\eta=0$ is evaluated at the outset in the base technology. If the combined evaluation equation is defined as $$C_f^{(m,s)} + \lambda D_f^{(m,s)}$$

where the original position of $\lambda$ is changed as such, the equation with $\lambda=0$ and $\eta=0$ will be $$C_f^{(m,s)}$$

only. As a result thereof, pixels would randomly matched to each other only because their pixel intensities are close, thus making the mapping totally meaningless. Transforming the mapping based on such a meaningless mapping makes no sense. Thus, the coefficient parameter is so determined that the identity mapping is initially selected for the evaluation as the best mapping.

Similar to this base technology, differences in the pixel intensity and smoothness are considered in a technique called "optical flow" that is known in the art. However, the optical flow technique cannot be used for image transformation since the optical flow technique takes into account only the local movement of an object. However, global correspondence can also be detected by utilizing the critical point filter according to the base technology.

[1. 3.] Determining the Mapping with Multiresolution

A mapping $f_{min}$ which gives the minimum energy and satisfies the BC is searched by using the multiresolution hierarchy. The mapping between the source subimage and the destination subimage at each level of the resolution is computed. Starting from the top of the resolution hierarchy (i.e., the coarsest level), the mapping is determined at each resolution level, and where possible, mappings at other levels are considered. The number of candidate mappings at each level is restricted by using the mappings at an upper (i.e., coarser) level of the hierarchy. More specifically speaking, in the course of determining a mapping at a certain level, the mapping obtained at the coarser level by one is imposed as a sort of constraint condition.

We thus define a parent and child relationship between resolution levels. When the following equation (15) holds, $$(i', j') = \left(\left\lfloor \frac{i}{2} \right\rfloor, \left\lfloor \frac{j}{2} \right\rfloor\right), \quad (15)$$

where $\lfloor x \rfloor$ denotes the largest integer not exceeding x, $$p_{(i',j')}^{(m-1,s)} \text{ and } q_{(i',j')}^{(m-1,s)}$$

are respectively called the parents of $$p_{(i,j)}^{(m,s)}$$

and $$q_{(i,j)}^{(m,s)},$$

conversely, $$p_{(i,j)}^{(m,s)} \text{ and } q_{(i,j)}^{(m,s)}$$

are the child of $$p_{(i',j')}^{(m-1,s)}$$

and the child of $$q_{(i',j')}^{(m-1,s)},$$

respectively. A function parent (i,j) is defined by the following equation (16):

$$\text{parent}(i, j) = \left(\left\lfloor \frac{i}{2} \right\rfloor, \left\lfloor \frac{j}{2} \right\rfloor\right) \quad (16)$$

Now, a mapping between $$p_{(i,j)}^{(m,s)} \text{ and } q_{(k,l)}^{(m,s)}$$

is determined by computing the energy and finding the minimum thereof. The value of $f^{(m,s)}(i,j)=(k,l)$ is determined as follows using $f(m-1,s)$ $(m=1,2,\ldots,n)$. First of all, a condition is imposed that $$q_{(k,l)}^{(m,s)}$$

should lie inside a quadrilateral defined by the following definitions (17) and (18). Then, the applicable mappings are narrowed down by selecting ones that are thought to be reasonable or natural among them satisfying the BC.

$$q_{g^{(m,s)}(i-1,j-1)}^{(m,s)} q_{g^{(m,s)}(i-1,j+1)}^{(m,s)} q_{g^{(m,s)}(i+1,j+1)}^{(m,s)} q_{g^{(m,s)}(i+1,j-1)}^{(m,s)} \quad (17)$$

where $$g^{(m,s)}(i,j)=f^{(m-1,s)}(\text{parent}(i,j))+f^{(m-1,s)}(\text{parent}(i,j)+(1,1)) \quad (18)$$

The quadrilateral defined above is hereinafter referred to as the inherited quadrilateral of $$p_{(i,j)}^{(m,s)}.$$

The pixel minimizing the energy is sought and obtained inside the inherited quadrilateral.

Figure 3:
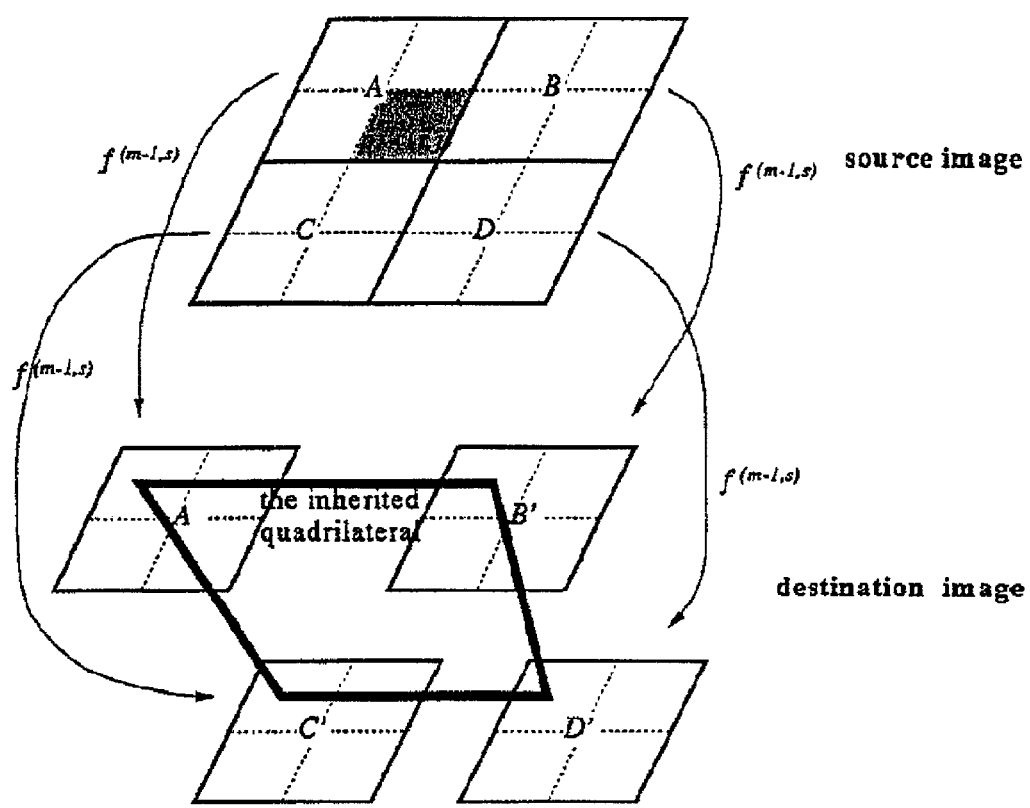
FIG. 3 is a diagram showing the relationship between a source image and a destination image and that between the m-th level and the (m−1)th level, using a quadrilateral.

FIG. 3 illustrates the above-described procedures. The pixels A, B, C and D of the source image are mapped to A', B', C' and D' of the destination image, respectively, at the (m−1)th level in the hierarchy. The pixel $$p_{(i,j)}^{(m,s)}$$

should be mapped to the pixel $$q_{f^{(m)}(i,j)}^{(m,s)}$$

which exists inside the inherited quadrilateral A'B'C'D'. Thereby, bridging from the mapping at the (m−1)th level to the mapping at the m-th level is achieved.

The energy $E_0$ defined above may now be replaced by the following equations (19) and (20):

$$E_{0_{(i,j)}}=\|f^{(m,0)}(i,j)-g^{(m)}(i,j)\|^2 \quad (19)$$

$$E_{0_{(i,j)}}=\|f^{(m,s)}(i,j)-f^{(m,s-1)}(i,j)\|^2, (1\leq i) \quad (20)$$

for computing the submapping $f^{(m,0)}$ and the submapping $f^{(m,s)}$ at the m-th level, respectively.

In this manner, a mapping which maintains a low energy of all the submappings is obtained. Using the equation (20) makes the submappings corresponding to the different critical points associated to each other within the same level in order that the subimages can have high similarity. The equation (19) represents the distance between $f^{(m,s)}(i,j)$ and the location where (i,j) should be mapped when regarded as a part of a pixel at the (m−1)the level.

When there is no pixel satisfying the BC inside the inherited quadrilateral A'B'C'D', the following steps are taken. First, pixels whose distance from the boundary of A'B'C'D' is L (at first, L=1) are examined. If a pixel whose energy is the minimum among them satisfies the BC, then this pixel will be selected as a value of $f^{(m,s)}(i,j)$. L is increased until such a pixel is found or L reaches its upper bound $$L_{\max}^{(m)} \cdot L_{\max}^{(m)}$$

is fixed for each level m. If no pixel is found at all, the third condition of the BC is ignored temporarily and such mappings that caused the area of the transformed quadrilateral to become zero (a point or a line) will be permitted so as to determine $f^{(m,s)}(i,j)$. If such a pixel is still not found, then the first and the second conditions of the BC will be removed.

Multiresolution approximation is essential to determining the global correspondence of the images while preventing the mapping from being affected by small details of the images. Without the multiresolution approximation, it is impossible to detect a correspondence between pixels whose distances are large. In the case where the multiresolution approximation is not available, the size of an image will generally be limited to a very small size, and only tiny changes in the images can be handled. Moreover, imposing smoothness on the mapping usually makes it difficult to find the correspondence of such pixels. That is because the energy of the mapping from one pixel to another pixel which is far therefrom is high. On the other hand, the multiresolution approximation enables finding the approximate correspondence of such pixels. This is because the distance between the pixels is small at the upper (coarser) level of the hierarchy of the resolution.

[1. 4] Automatic Determination of the Optimal Parameter Values

One of the main deficiencies of the existing image matching techniques lies in the difficulty of parameter adjustment. In most cases, the parameter adjustment is performed manually and it is extremely difficult to select the optimal value. However, according to the base technology, the optimal parameter values can be obtained completely automatically.

The systems according to this base technology include two parameters, namely, $\lambda$ and $\eta$, where $\lambda$ and $\eta$ represent the weight of the difference of the pixel intensity and the stiffness of the mapping, respectively. In order to automatically determine these parameters, the are initially set to 0. First, $\lambda$ is gradually increased from $\lambda=0$ while $\eta$ is fixed at 0. As $\lambda$ becomes larger and the value of the combined evaluation equation (equation (14)) is minimized, the value of $$C_f^{(m,s)}$$

for each submapping generally becomes smaller. This basically means that the two images are matched better. However, if λ exceeds the optimal value, the following phenomena occur:
1. Pixels which should not be corresponded are erroneously corresponded only because their intensities are close.
2. As a result, correspondence between images becomes inaccurate, and the mapping becomes invalid.
3. As a result, $$D_f^{(m,s)}$$

in equation (14) tends to increase abruptly.
4. As a result, since the value of equation (14) tends to increase abruptly, $f^{(m,s)}$ changes in order to suppress the abrupt increase of $$D_f^{(m,s)}.$$

As a result, $$C_f^{(m,s)}$$

increases.

Therefore, a threshold value at which $$C_f^{(m,s)}$$

turns to an increase from a decrease is detected while a state in which equation (14) takes the minimum value with λ being increased is kept. Such λ is determined as the optimal value at η=0. Next, the behavior of $$C_f^{(m,s)}$$

is examined while η is increased gradually, and η will be automatically determined by a method described later. λ will then again be determined corresponding to such an automatically determined η.

The above-described method resembles the focusing mechanism of human visual systems. In the human visual systems, the images of the respective right eye and left eye are matched while moving one eye. When the objects are clearly recognized, the moving eye is fixed.

[1. 4. 1] Dynamic Determination of λ

Initially, λ is increased from 0 at a certain interval, and a subimage is evaluated each time the value of λ changes. As shown in equation (14), the total energy is defined by $$\lambda C_f^{(m,s)} + D_f^{(m,s)} \cdot D_{(i,j)}^{(m,s)}$$

in equation (9) represents the smoothness and theoretically becomes minimum when it is the identity mapping. $E_0$ and $E_1$ increase as the mapping is further distorted. Since $E_1$ is an integer, 1 is the smallest step of $$D_f^{(m,s)}.$$

Thus, it is impossible to change the mapping to reduce the total energy unless a changed amount (reduction amount) of the current $$\lambda C_{(i,j)}^{(m,s)}$$

is equal to or greater than 1. Since $$D_f^{(m,s)}$$

increases by more than 1 accompanied by the change of the mapping, the total energy is not reduced unless $$\lambda C_{(i,j)}^{(m,s)}$$

is reduced by more than 1.

Under this condition, it is shown that $$C_{(i,j)}^{(m,s)}$$

decreases in normal cases as λ increases. The histogram of $$C_{(i,j)}^{(m,s)}$$

is denoted as h(l), where h(l) is the number of pixels whose energy $$C_{(i,j)}^{(m,s)}$$

is $l^2$. In order that $\lambda l^2 \geq 1$ for example, the case of $l^2 = 1/\lambda$ is considered. When λ varies from $\lambda_1$ to $\lambda_2$, a number of pixels (denoted A) expressed by the following equation (21):

$$A = \sum_{l=\lceil \frac{1}{\lambda_2} \rceil}^{\lfloor \frac{1}{\lambda_1} \rfloor} h(l) \cong \int_{l=\frac{1}{\lambda_2}}^{\frac{1}{\lambda_1}} h(l)\, dl = -\int_{\lambda_2}^{\lambda_1} h(l)\frac{1}{\lambda^{3/2}}\, d\lambda = \int_{\lambda_1}^{\lambda_2} \frac{h(l)}{\lambda^{3/2}}\, d\lambda \quad (21)$$

changes to a more stable state having the energy shown in equation (22)

$$C_f^{(m,s)} - l^2 = C_f^{(m,s)} - \frac{1}{\lambda}. \quad (22)$$

Here, it is assumed that the energy of these pixels is approximated to be zero. This means that the value of $$C_{(i,j)}^{(m,s)}$$

changes by:

$$\partial C_f^{(m,s)} = -\frac{A}{\lambda} \quad (23)$$

As a result, equation (24) holds.

$$\frac{\partial C_f^{(m,s)}}{\partial \lambda} = -\frac{h(l)}{\lambda^{5/2}} \quad (24)$$

Since $h(l)>0$, $$C_f^{(m,s)}$$

decreases in the normal case. However, when $\lambda$ exceeds the optimal value, the above phenomenon, that is, an increase in $$C_f^{(m,s)}$$

occurs. The optimal value of $\lambda$ is determined by detecting this phenomenon.

When $$h(l) = Hl^k = \frac{H}{\lambda^{k/2}} \quad (25)$$

is assumed, where both H(H>0) and k are constants, the equation (26) holds:

$$\frac{\partial C_f^{(m,s)}}{\partial \lambda} = -\frac{H}{\lambda^{5/2+k/2}} \quad (26)$$

Then, if $k \neq -3$, the following equation (27) holds:

$$C_f^{(m,s)} = C + \frac{H}{(3/2+k/2)\lambda^{3/2+k/2}} \quad (27)$$

The equation (27) is a general equation of $$C_f^{(m,s)}$$

(where C is a constant).

When detecting the optimal value of $\lambda$, the number of pixels violating the BC may be examined for safety. In the course of determining a mapping for each pixel, the probability of violating the BC is assumed as a value $p_0$ here. In this case, since $$\frac{\partial A}{\partial \lambda} = \frac{h(l)}{\lambda^{3/2}} \quad (28)$$

holds, the number of pixels violating the BC increases at a rate of:

$$B_0 = \frac{h(l)p_0}{\lambda^{3/2}} \quad (29)$$

Thus, $$\frac{B_0 \lambda^{3/2}}{p_0 h(l)} = 1 \quad (30)$$

is a constant. If it is assumed that $h(l)=Hl^k$, the following equation (31), for example, $$B_0 \lambda^{3/2+k/2} = p_0 H \quad (31)$$

becomes a constant. However, when $\lambda$ exceeds the optimal value, the above value of equation (31) increases abruptly. By detecting this phenomenon, i.e. whether or not the value of $B_0\lambda^{3/2+k/2}/2^m$ exceeds an abnormal value $B_{0thres}$ the optimal value of $\lambda$ can be determined. Similarly, whether or not the value of $B_1\lambda^{3/2+k/2}/2^m$ exceeds an abnormal value $B_{1thres}$ can be used to check for an increasing rate $B_1$ of pixels violating the third condition of the BC. The reason why the factor $2^m$ is introduced here will be described at a later stage. This system is not sensitive to the two threshold values $B_{0thres}$ and $B_{1\ thres}$. The two threshold values $B_{0thres}$ and $B_{1\ thres}$ can be used to detect excessive distortion of the mapping which may not be detected through observation of the energy $$C_f^{(m,s)}.$$

In the experimentation, when $\lambda$ exceeded 0.1 the computation of $f^{(m,s)}$ was stopped and the computation of $f^{(m,s+1)}$ was started. That is because the computation of submappings is affected by a difference of only 3 out of 255 levels in pixel intensity when $\lambda>0.1$ and it is then difficult to obtain a correct result.

[1. 4. 2] Histogram h(l)

The examination of $$C_f^{(m,s)}$$

does not depend on the histogram h(l), however, the examination of the BC and its third condition may be affected by h(l). When $$(\lambda, C_f^{(m,s)})$$

is actually plotted, k is usually close to 1. In the experiment, k=1 is used, that is, $B_0\lambda^2$ and $B_1\lambda^2$ are examined. If the true value of k is less than 1, $B_0\lambda^2$ and $B_1\lambda^2$ are not constants and increase gradually by a factor of $\lambda^{(1-k)/2}$. If h(l) is a constant, the factor is, for example, $\lambda^{1/2}$. However, such a difference can be absorbed by setting the threshold $B_{0thres}$ appropriately.

Let us model the source image by a circular object, with its center at $(x_0, y_0)$ and its radius r, given by:

$$p(i,j) = \begin{cases} \frac{255}{r} c\left(\sqrt{(i-x_0)^2 + (j-y_0)^2}\right) & \ldots \left(\sqrt{(i-x_0)^2 + (j-y_0)^2} \leq r\right) \\ 0 & \ldots \text{(otherwise)} \end{cases} \quad (32)$$

and the destination image given by:

$$q(i,j) = \begin{cases} \frac{255}{r} c\left(\sqrt{(i-x_1)^2 + (j-y_1)^2}\right) & \ldots \left(\sqrt{(i-x_1)^2 + (j-y_1)^2} \leq r\right) \\ 0 & \ldots \text{(otherwise)} \end{cases} \quad (33)$$

with its center at $(x_1, y_1)$ and radius r. In the above, let c(x) have the form of $c(x)=x^k$. When the centers $(x_0, y_0)$ and $(x_1, y_1)$ are sufficiently far from each other, the histogram h(l) is then in the form:

$$h(l) \propto rl^k (k \neq 0) \quad (34)$$

When k=1, the images represent objects with clear boundaries embedded in the background. These objects become darker toward their centers and brighter toward their boundaries. When k=-1, the images represent objects with vague boundaries. These objects are brightest at their centers, and become darker toward their boundaries. Without much loss of generality, it suffices to state that objects in images are generally between these two types of objects. Thus, choosing k such that $-1 \leq k \leq 1$ can cover most cases and the equation (27) is generally a decreasing function for this range.

As can be observed from the above equation (34), attention must be directed to the fact that r is influenced by the resolution of the image, that is, r is proportional to $2^m$. This is the reason for the factor $2^m$ being introduced in the above section [1.4.1].

[1. 4. 3] Dynamic Determination of η

The parameter η can also be automatically determined in a similar manner. Initially, η is set to zero, and the final mapping $f^{(n)}$ and the energy $$C_f^{(n)}$$

at the finest resolution are computed. Then, after η is increased by a certain value Δη, the final mapping $f^{(n)}$ and the energy $$C_f^{(n)}$$

at the finest resolution are again computed. This process is repeated until the optimal value of η is obtained. η represents the stiffness of the mapping because it is a weight of the following equation (35):

$$E_{0(i,j)}^{(m,s)} = \|f^{(m,s)}(i,j) - f^{(m,s-1)}(i,j)\|^2 \quad (35)$$

Figure 4:
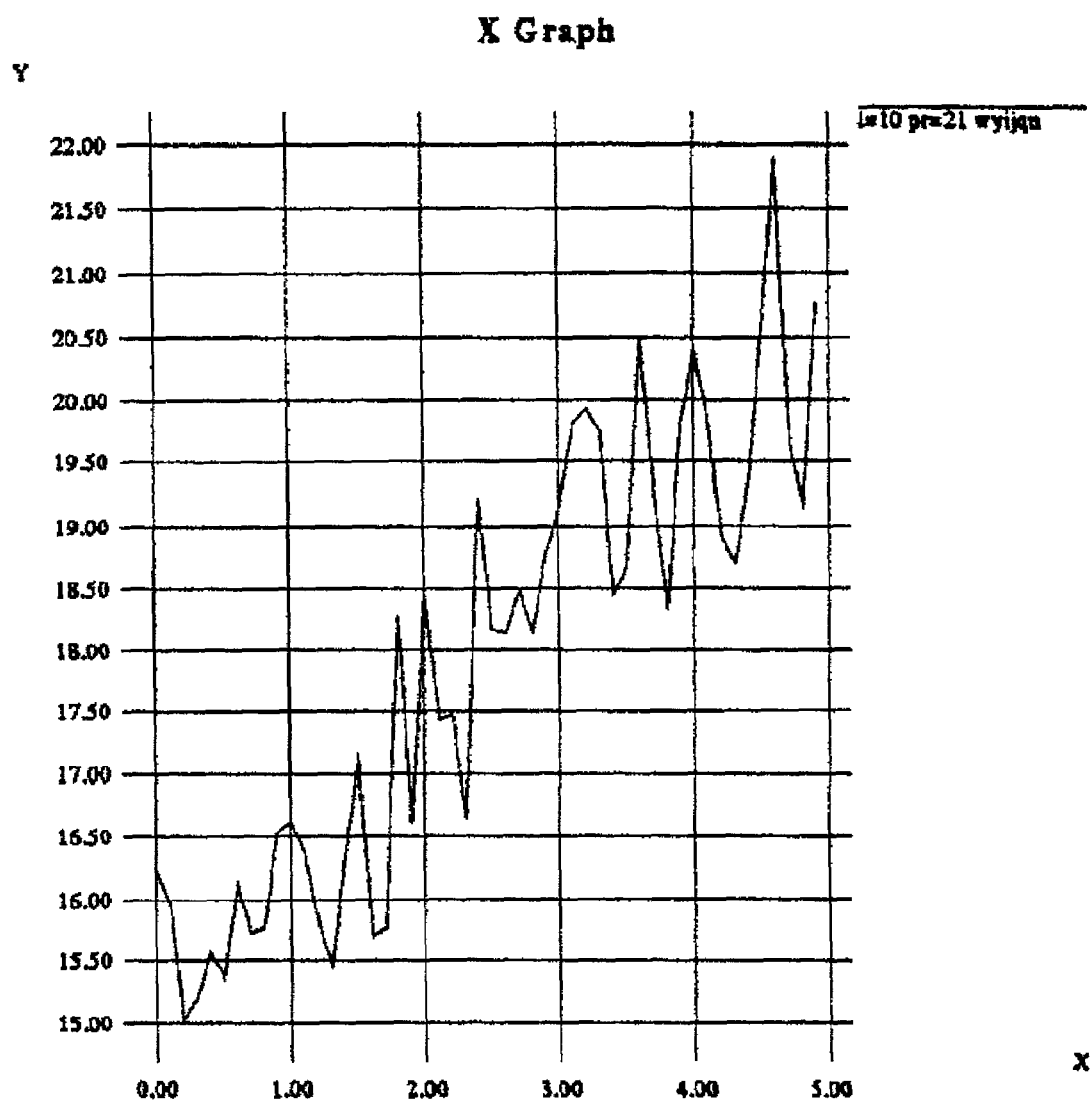
FIG. 4 shows the relationship between a parameter η (represented by x-axis) and energy $C_f$ (represented by y-axis)

If η is zero, $$D_f^{(n)}$$

is determined irrespective of the previous submapping, and the present submapping may be elastically deformed and become too distorted. On the other hand, if η is a very large value, $$D_f^{(n)}$$

is almost completely determined by the immediately previous submapping. The submappings are then very stiff, and the pixels are mapped to almost the same locations. The resulting mapping is therefore the identity mapping. When the value of η increases from 0, $$C_f^{(n)}$$

gradually decreases as will be described later. However, when the value of η exceeds the optimal value, the energy starts increasing as shown in FIG. 4. In FIG. 4, the x-axis represents η, and y-axis represents $C_f$.

The optimum value of η which minimizes $$C_f^{(n)}$$

can be obtained in this manner. However, since various elements affect this computation as compared to the case of λ, $$C_f^{(n)}$$

changes while slightly fluctuating. This difference is caused because a submapping is re-computed once in the case of λ whenever an input changes slightly, whereas all the submappings must be re-computed in the case of η. Thus, whether the obtained value of $$C_f^{(n)}$$

is the minimum or not cannot be determined as easily. When candidates for the minimum value are found, the true minimum needs to be searched by setting up further finer intervals.

[1. 5] Supersampling

When deciding the correspondence between the pixels, the range of $f^{(m,s)}$ can be expanded to R×R (R being the set of real numbers) in order to increase the degree of freedom. In this case, the intensity of the pixels of the destination image is interpolated, to provide $f^{(m,s)}$ having an intensity at non-integer points:

$$V(q_{f(m,s)(i,j)}^{(m,s)})  \qquad (36)$$

That is, supersampling is performed. In an example implementation, $f^{(m,s)}$ may take integer and half integer values, and $$V(q_{(i,j)+(0.5,0.5)}^{(m,s)}) \qquad (37)$$

is given by $$(V(q_{(i,j)}^{(m,s)}) + V(q_{(i,j)+(1,1)}^{(m,s)}))/2 \qquad (38)$$

[1. 6] Normalization of the Pixel Intensity of Each Image

When the source and destination images contain quite different objects, the raw pixel intensity may not be used to compute the mapping because a large difference in the pixel intensity causes excessively large energy $$C_f^{(m,s)}$$

and thus making it difficult to obtain an accurate evaluation.

For example, a matching between a human face and a cat's face is computed as shown in FIGS. 20(*a*) and 20(*b*). The cat's face is covered with hair and is a mixture of very bright pixels and very dark pixels. In this case, in order to compute the submappings of the two faces, subimages are normalized. That is, the darkest pixel intensity is set to 0 while the brightest pixel intensity is set to 255, and other pixel intensity values are obtained using linear interpolation.

[1. 7] Implementation

In an example implementation, a heuristic method is utilized wherein the computation proceeds linearly as the source image is scanned. First, the value of $f^{(m,s)}$ is determined at the top leftmost pixel (i,j)=(0,0). The value of each $f^{(m,s)}(i,j)$ is then determined while i is increased by one at each step. When i reaches the width of the image, j is increased by one and i is reset to zero. Thereafter, $f^{(m,s)}(i,j)$ is determined while scanning the source image. Once pixel correspondence is determined for all the points, it means that a single mapping $f^{(m,s)}$ is determined.

When a corresponding point $q_{f(i,j)}$ is determined for $p_{(i,j)}$, a corresponding point $q_{f(i,j+1)}$ of $p_{(i,j+1)}$ is determined next. The position of $q_{f(i,j+1)}$ is constrained by the position of $q_{f(i,j)}$, since the position of $q_{f(i,j+1)}$ satisfies the BC. Thus, in this system, a point whose corresponding point is determined earlier is given higher priority. If the situation continues in which (0,0) is always given the highest priority, the final mapping might be unnecessarily biased. In order to avoid this bias, $f^{(m,s)}$ is determined in the following manner in the base technology.

First, when (s mod 4) is 0, $f^{(m,s)}$ is determined starting from (0,0) while gradually increasing both i and j. When (s mod 4) is 1, $f^{(m,s)}$ is determined starting from the top rightmost location while decreasing i and increasing j. When (s mod 4) is 2, $f^{(m,s)}$ is determined starting from the bottom rightmost location while decreasing both i and j. When (s mod 4) is 3, $f^{(m,s)}$ is determined starting from the bottom leftmost location while increasing i and decreasing j. Since a concept such as the submapping, that is, a parameter s, does not exist in the finest n-th level, $f^{(m,s)}$ is computed continuously in two directions on the assumption that s=0 and s=2.

In this implementation, the values of $f^{(m,s)}(i,j)$ (m=0, . . . ,n) that satisfy the BC are chosen as much as possible from the candidates (k,l) by imposing a penalty on the candidates violating the BC. The energy $D_{(k,l)}$ of a candidate that violates the third condition of the BC is multiplied by φ and that of a candidate that violates the first or second condition of the BC is multiplied by ψ. In this implementation, φ=2 and ψ=100000 are used.

In order to check the above-mentioned BC, the following test may be performed as the procedure when determining (k,l)=$f^{(m,s)}(i,j)$. Namely, for each grid point (k,l) in the inherited quadrilateral of $f^{(m,s)}(i,j)$, whether or not the z-component of the outer product of $$W = \vec{A} \times \vec{B} \qquad (39)$$

is equal to or greater than 0 is examined, where $$\vec{A} = \overrightarrow{q_{f(m,s)(i,j-1)}^{(m,s)} q_{f(m,s)(i+1,j-1)}^{(m,s)}} \qquad (40)$$

-continued $$\vec{B} = \overrightarrow{q^{(m,s)}_{f(m,s)(i,j-1)} q^{(m,s)}_{(k,l)}} \quad (41)$$

Here, the vectors are regarded as 3D vectors and the z-axis is defined in the orthogonal right-hand coordinate system. When W is negative, the candidate is imposed with a penalty by multiplying $$D^{(m,s)}_{(k,l)}$$

by ψ so that it is not as likely to be selected.

Figure 5A:
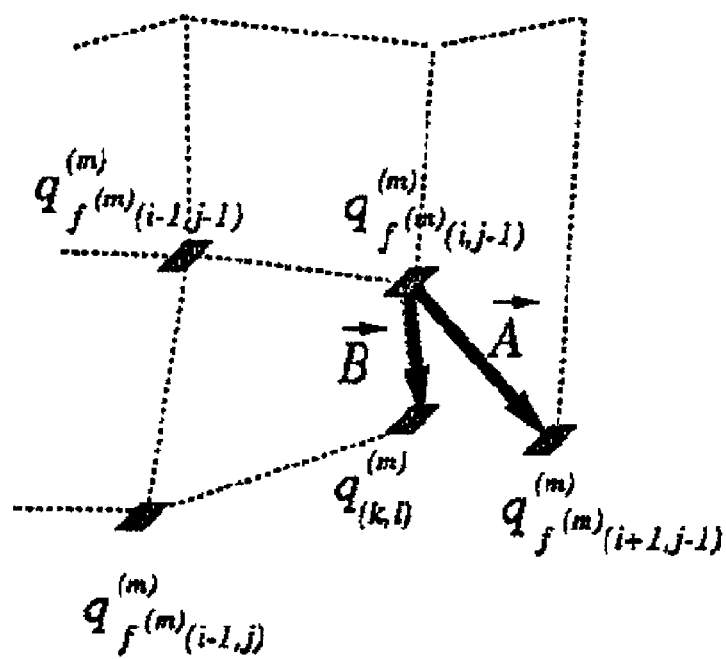
FIG. 5(a) is a diagram illustrating determination of whether or not the mapping for a certain point satisfies the bijectivity condition through the outer product computation.
Figure 5B:
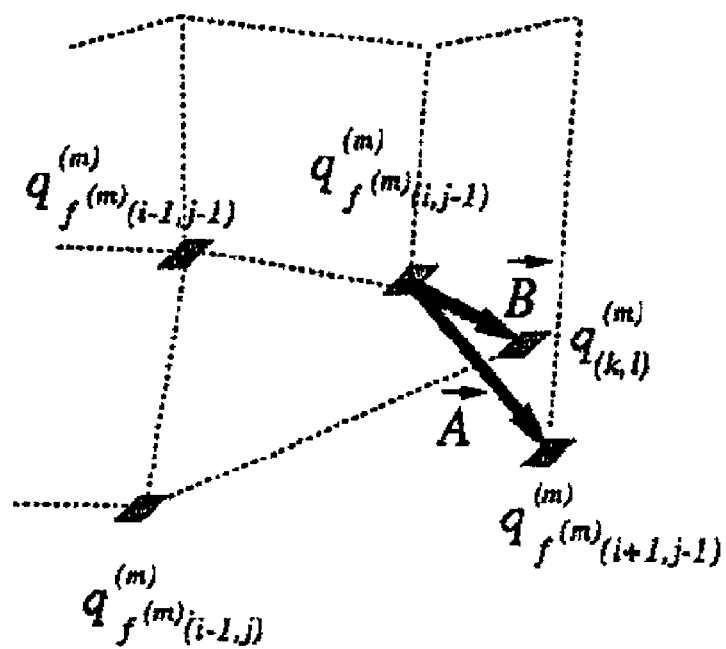
FIG. 5(b) is a diagram illustrating determination of whether or not the mapping for a certain point satisfies the bijectivity condition through the outer product computation.

FIGS. 5(a) and 5(b) illustrate the reason why this condition is inspected. FIG. 5(a) shows a candidate without a penalty and FIG. 5(b) shows one with a penalty. When determining the mapping $f^{(m,s)}(i,j+1)$ for the adjacent pixel at (i,j+1), there is no pixel on the source image plane that satisfies the BC if the z-component of W is negative because then $$q^{(m,s)}_{(k,l)}$$

passes the boundary of the adjacent quadrilateral.

[1. 7. 1] The Order of Submappings

In this implementation, σ(0)=0, σ(1)=1, σ(2)=2, σ(3)=3, σ(4)=0 are used when the resolution level is even, while σ(0)=3, σ(1)=2, σ(2)=1, σ(3)=0, σ(4)=3 are used when the resolution level is odd. Thus, the submappings are shuffled to some extent. It is to be noted that the submappings are primarily of four types, and s may be any of 0 to 3. However, a processing with s=4 is used in this implementation for a reason to be described later.

[1. 8] Interpolations

After the mapping between the source and destination images is determined, the intensity values of the corresponding pixels are interpolated. In the implementation, trilinear interpolation is used. Suppose that a square $p_{(i,j)}p_{(i+1,j)}p_{(i+1,j+1)}p_{(i,j+1)}$ on the source image plane is mapped to a quadrilateral $q_{f(i,j)}q_{f(i+1,j)}q_{f(i+1,j+1)}q_{f(i,j+1)}$ on the destination image plane. For simplicity, the distance between the image planes is assumed to be 1. The intermediate image pixels r(x,y,t) (0≤x≤N−1, 0≤y≤M−1) whose distance from the source image plane is t (0≤t≤1) are obtained as follows. First, the location of the pixel r(x,y,t), where x,y,t∈R, is determined by equation (42):

$$(x, y) = (1 - dx)(1 - dy)(1 - t)(i, j) + (1 - dx)(1 - dy)tf(i, j) + \quad (42)$$
$$dx(1 - dy)(1 - t)(i + 1, j) + dx(1 - dy)tf(i + 1, j) +$$
$$(1 - dx)dy(1 - t)(i, j + 1) + (1 - dx)dytf(i, j + 1) +$$
$$dxdy(1 - t)(i + 1, j + 1) + dxdytf(i + 1, j + 1)$$

The value of the pixel intensity at r(x,y,t) is then determined by equation (43):

$$V(r(x, y, t)) = (1 - dx)(1 - dy)(1 - t)V(p_{(i,j)}) + (1 - dx)(1 - dy)tV(q_{f(i,j)}) + \quad (43)$$
$$dx(1 - dy)(1 - t)V(p_{(i+1,j)}) + dx(1 - dy)tV(q_{f(i+1,j)}) +$$
$$(1 - dx)dy(1 - t)V(p_{(i,j+1)}) + (1 - dx)dytV(q_{f(i,j+1)}) +$$
$$dxdy(1 - t)V(p_{(i+1,j+1)}) + dxdytV(q_{f(i+1,j+1)})$$

where dx and dy are parameters varying from 0 to 1.

[1. 9] Mapping to which Constraints are Imposed

So far, the determination of a mapping in which no constraints are imposed has been described. However, if a correspondence between particular pixels of the source and destination images is provided in a predetermined manner, the mapping can be determined using such correspondence as a constraint.

The basic idea is that the source image is roughly deformed by an approximate mapping which maps the specified pixels of the source image to the specified pixels of the destination image and thereafter a mapping f is accurately computed.

First, the specified pixels of the source image are mapped to the specified pixels of the destination image, then the approximate mapping that maps other pixels of the source image to appropriate locations are determined. In other words, the mapping is such that pixels in the vicinity of a specified pixel are mapped to locations near the position to which the specified one is mapped. Here, the approximate mapping at the m-th level in the resolution hierarchy is denoted by $F^{(m)}$.

The approximate mapping F is determined in the following manner. First, the mappings for several pixels are specified. When $n_s$ pixels $$p(i_0,j_0), p(i_1,j_1), \ldots, p(i_{n_s-1},j_{n_s-1}) \quad (44)$$

of the source image are specified, the following values in the equation (45) are determined.

$$F^{(n)}(i_0,j_0)=(k_0,l_0),$$

$$F^{(n)}(i_1,j_1)=(k_1,l_1), \ldots,$$

$$F^{(n)}(i_{n_s-1},j_{n_s-1})=(k_{n_s-1},l_{n_s-1}), \quad (45)$$

For the remaining pixels of the source image, the amount of displacement is the weighted average of the displacement of $p(i_h,j_h)$ (h=0, . . . , $n_s$−1). Namely, a pixel $p_{(i,j)}$ is mapped to the following pixel (expressed by the equation (46)) of the destination image.

$$F^{(m)}(i,j) = \frac{(i,j) + \sum_{h=0}^{h=n_s-1}(k_h - i_h, l_h - j_h)\text{weight}_h(i,j)}{2^{n-m}} \quad (46)$$

where $$\text{weight}_h(i,j) = \frac{1/\|(i_h - i, j_h - j)\|^2}{\text{total\_weight}(i,j)} \quad (47)$$

where $$\text{total\_weight}(i,j) = \sum_{h=0}^{h=n_s-1} 1/\|(i_h - i, j_h - j)\|^2 \quad (48)$$

Second, the energy $$D_{(i,j)}^{(m,s)}$$

of the candidate mapping f is changed so that a mapping f similar to $F^{(m)}$ has a lower energy. Precisely speaking, $$D_{(i,j)}^{(m,s)}$$

is expressed by the equation (49):

$$D_{(i,j)}^{(m,s)} = E_{0(i,j)}^{(m,s)} + \eta E_{1(i,j)}^{(m,s)} \kappa E_{2(i,j)}^{(m,s)} \quad (49)$$

where $$E_{2(i,j)}^{(m,s)} = \begin{cases} 0, & \text{if}\|F^{(m)}(i,j) - f^{(m,s)}(i,j)\|^2 \leq \left\lfloor \frac{\rho^2}{2^{2(n-m)}} \right\rfloor \\ \|F^{(m)}(i,j) - f^{(m,s)}(i,j)\|^2, & \text{otherwise} \end{cases} \quad (50)$$

where $\kappa, \rho \geq 0$. Finally, the resulting mapping f is determined by the above-described automatic computing process.

Note that $$E_{2(i,j)}^{(m,s)}$$

becomes 0 if $f^{(m,s)}(i,j)$ is sufficiently close to $F^{(m)}(i,j)$ i.e., the distance therebetween is equal to or less than $$\left\lfloor \frac{\rho^2}{2^{2(n-m)}} \right\rfloor \quad (51)$$

This has been defined in this way because it is desirable to determine each value $f^{(m,s)}(i,j)$ automatically to fit in an appropriate place in the destination image as long as each value $f^{(m,s)}(i,j)$ is close to $F^{(m)}(i,j)$. For this reason, there is no need to specify the precise correspondence in detail to have the source image automatically mapped so that the source image matches the destination image.

[2] Concrete Processing Procedure

The flow of a process utilizing the respective elemental techniques described in [1] will now be described.

Figure 6:
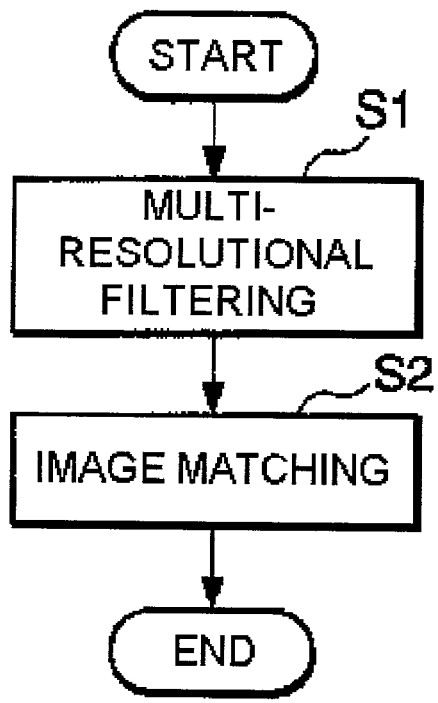
FIG. 6 is a flowchart of the entire procedure of a preferred embodiment in the base technology.

FIG. 6 is a flowchart of the overall procedure of the base technology. Referring to FIG. 6, a source image and destination image are first processed using a multiresolutional critical point filter (S1). The source image and the destination image are then matched (S2). As will be understood, the matching (S2) is not required in every case, and other processing such as image recognition may be performed instead, based on the characteristics of the source image obtained at S1.

Figure 7:
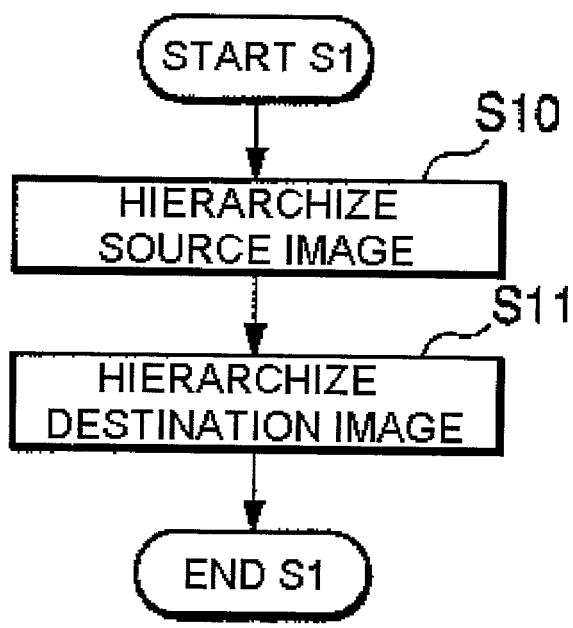
FIG. 7 is a flowchart showing the details of the process at S1 in FIG. 6.

FIG. 7 is a flowchart showing details of the process S1 shown in FIG. 6. This process is performed on the assumption that a source image and a destination image are matched at S2. Thus, a source image is first hierarchized using a critical point filter (S10) so as to obtain a series of source hierarchical images. Then, a destination image is hierarchized in the similar manner (S11) so as to obtain a series of destination hierarchical images. The order of S10 and S11 in the flow is arbitrary, and the source image and the destination image can be generated in parallel. It may also be possible to process a number of source and destination images as required by subsequent processes.

Figure 8:
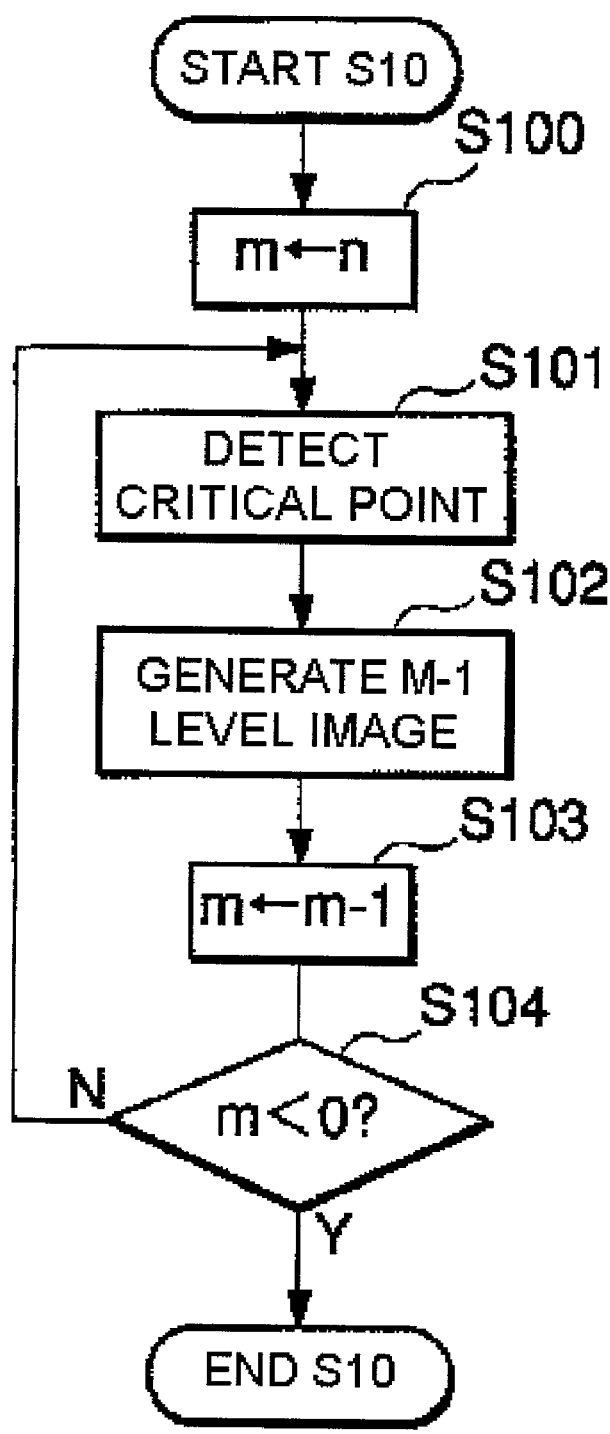
FIG. 8 is a flowchart showing the details of the process at S10 in FIG. 7.

FIG. 8 is a flowchart showing details of the process at S10 shown in FIG. 7. Suppose that the size of the original source image is $2^n \times 2^n$. Since source hierarchical images are sequentially generated from an image with a finer resolution to one with a coarser resolution, the parameter m which indicates the level of resolution to be processed is set to n (S100). Then, critical points are detected from the images $p^{(m,0)}$, $p^{(m,1)}$, $p^{(m,2)}$ the $p^{(m,3)}$ of the m-th level of resolution, using a critical point filter (S101), so that the images $p^{(m-1,0)}$, $p^{(m-1,1)}$, $p^{(m-1,2)}$ and $p^{(m-1,3)}$ of the (m-1)th level are generated (S102). Since m=n here, $p^{(m,0)}=p^{(m,1)}=p^{(m,2)}=p^{(m,3)}=p^{(n)}$ holds and four types of subimages are thus generated from a single source image.

Figure 9:
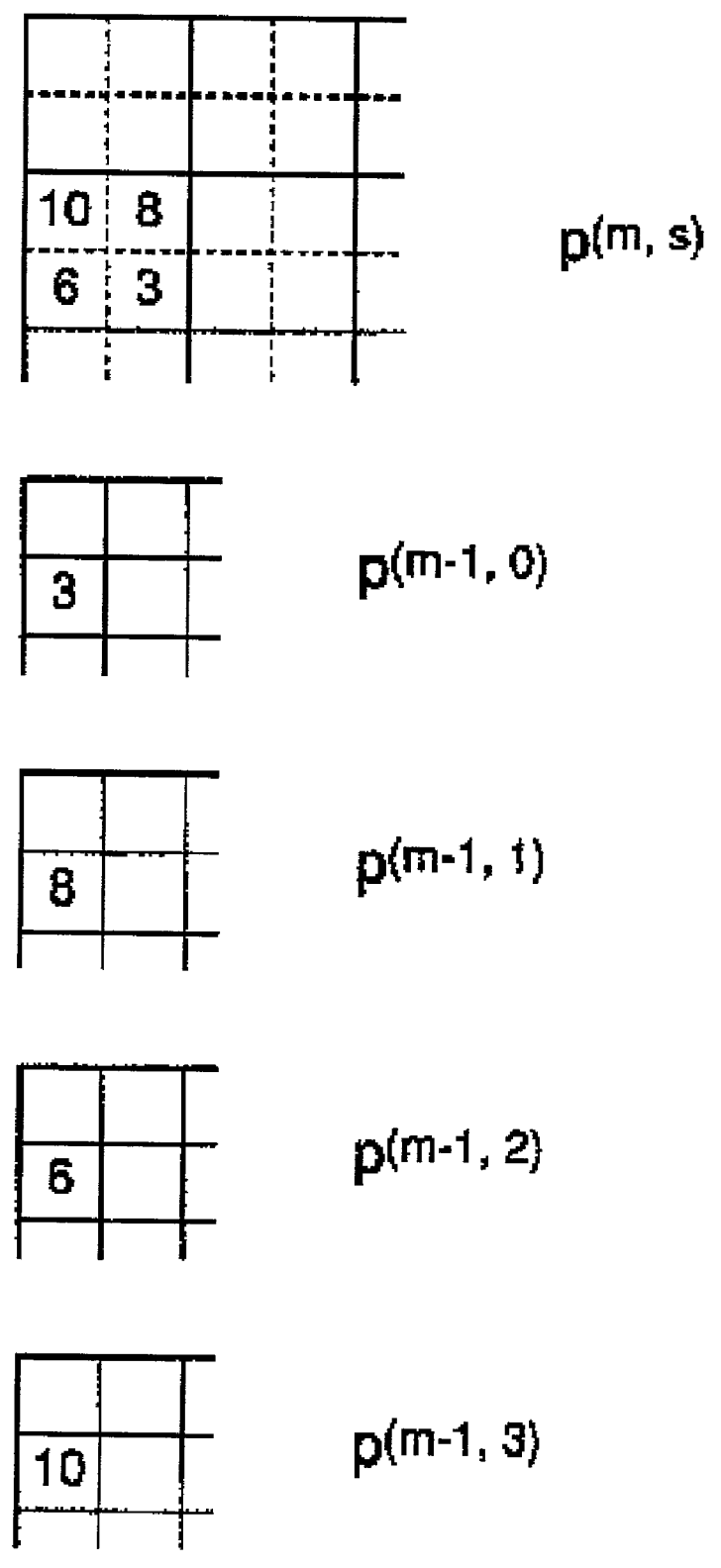

FIG. 9 shows correspondence between partial images of the m-th and those of (m-1)th levels of resolution. Referring to FIG. 9, respective numberic values shown in the figure represent the intensity of respective pixels. $p^{(m,s)}$ symbolizes any one of four images $p^{(m,0)}$ through $p^{(m,3)}$, and when generating $p^{(m-1,0)}$, $p^{(m,0)}$ is used from $p^{(m,s)}$. For example, as for the block shown in FIG. 9, comprising four pixels with their pixel intensity values indicated inside, images $p^{(m-1,0)}$, $p^{(m-1,1)}$, $p^{(m-1,2)}$ and $p^{(m-1,3)}$ acquire "3", "8", "6" and "10", respectively, according to the rules described in [1.2]. This block at the m-th level is replaced at the (m-1)th level by respective single pixels thus acquired. Therefore, the size of the subimages at the (m-1)th level is $2^{m-1} \times 2^{m-1}$.

After m is decremented (S103 in FIG. 8), it is ensured that m is not negative (S104). Thereafter, the process returns to S101, so that subimages of the next level of resolution, i.e., a next coarser level, are generated. The above process is repeated until subimages at m=0 (0-th level) are generated to complete the process at S10. The size of the subimages at the 0-th level is 1×1.

Figure 10:
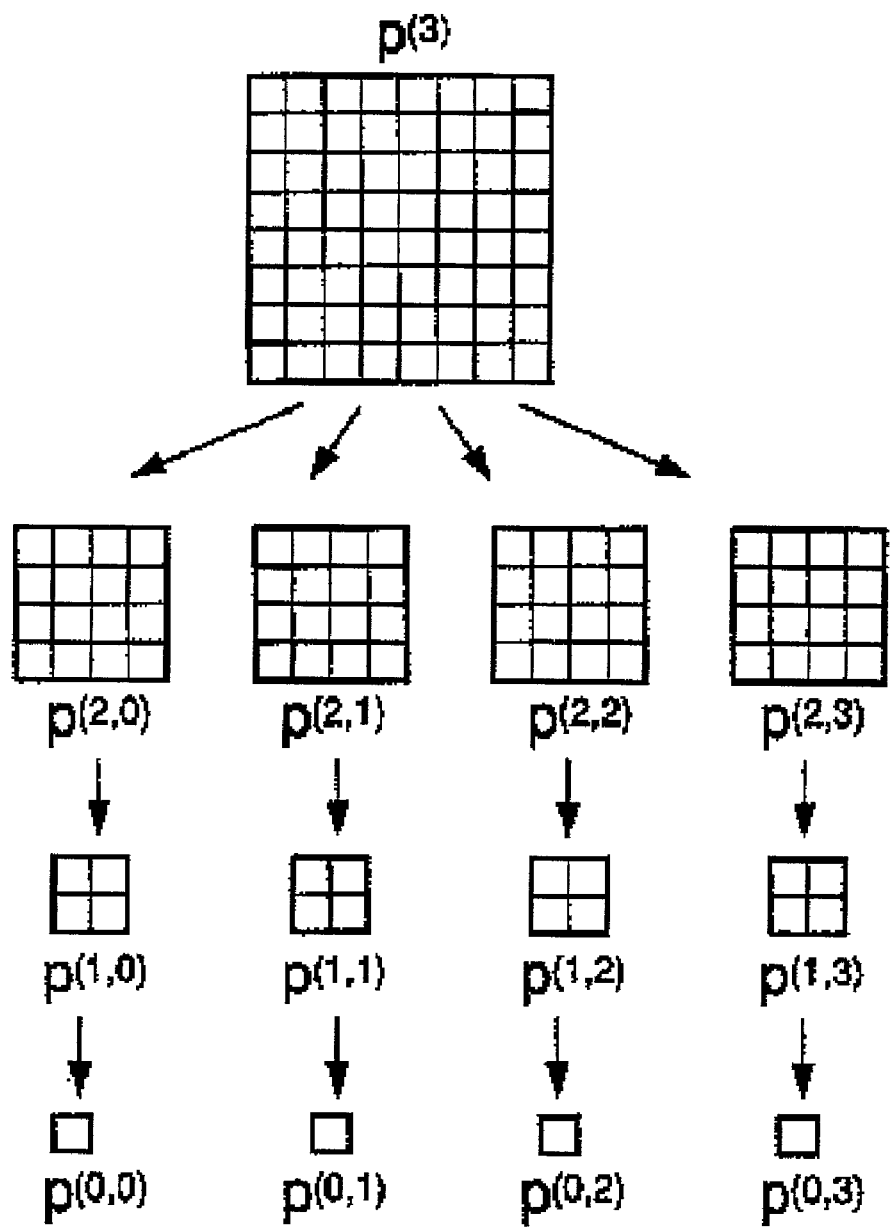
FIG. 10 is a diagram showing source hierarchical images generated in the embodiment in the base technology.

FIG. 10 shows source hierarchical images generated at S10 in the case of n=3. The initial source image is the only image common to the four series followed. The four types of subimages are generated independently, depending on the type of critical point. Note that the process in FIG. 8 is common to S11 shown in FIG. 7, and that destination hierarchical images are generated through a similar procedure. Then, the process at S1 in FIG. 6 is completed.

Figure 11:
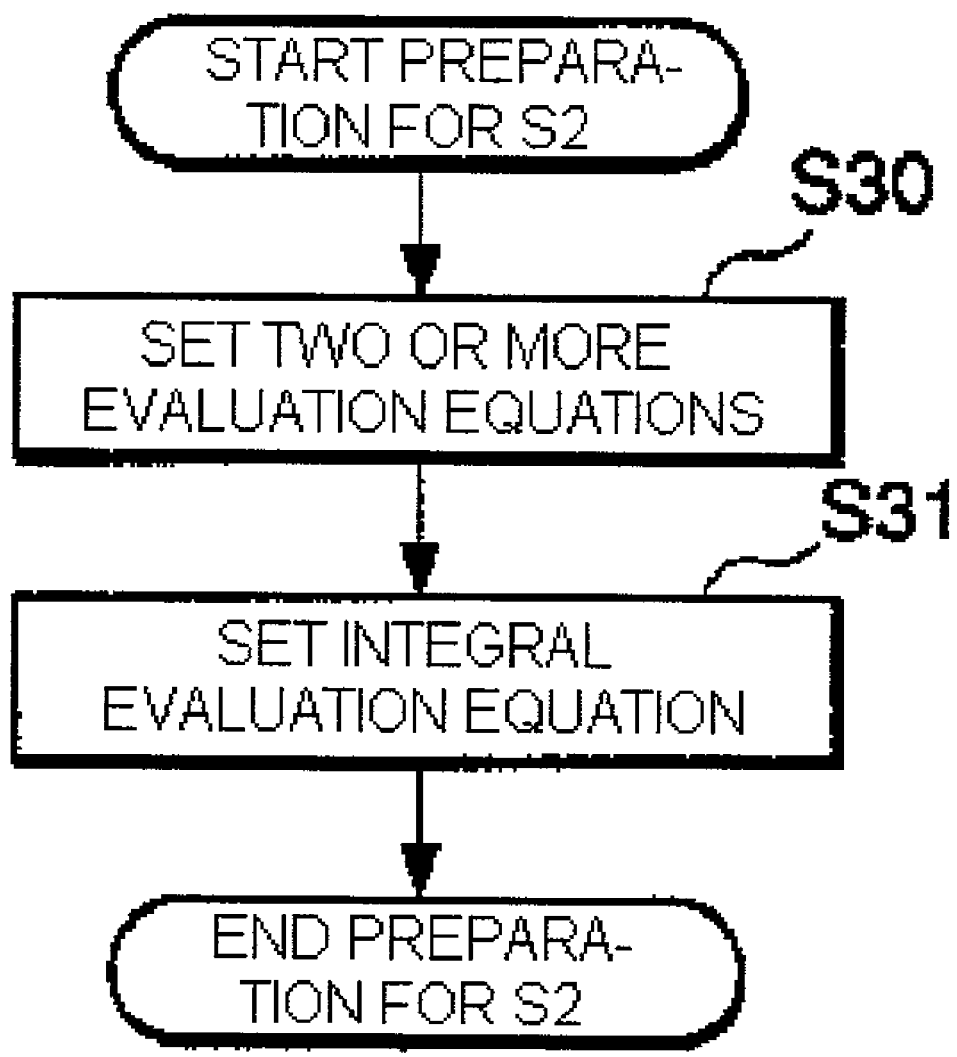
FIG. 11 is a flowchart of a preparation procedure for S2 in FIG. 6.

In this base technology, in order to proceed to S2 shown in FIG. 6 a matching evaluation is prepared. FIG. 11 shows the preparation procedure. Referring to FIG. 11, a plurality of evaluation equations are set (S30). The evaluation equations may include the energy $$C_f^{(m,s)}$$

concerning a pixel value, introduced in [1.3.2.1], and the energy $$D_f^{(m,s)}$$

concerning the smoothness of the mapping introduced in [1.3.2.2]. Next, by combining these evaluation equations, a combined evaluation equation is set (S31). Such a combined evaluation equation may be $$\lambda C_{(i,j)}^{(m,s)} + D_f^{(m,s)}.$$

Using η introduced in [1.3.2.2], we have $$\sum\sum\left(\lambda C_{(i,j)}^{(m,s)} + \eta E_{0_{(i,j)}}^{(m,s)} + E_{1_{(i,j)}}^{(m,s)}\right) \quad (52)$$

In the equation (52) the sum is taken for each i and j where i and j run through $0, 1, \ldots, 2^{m-1}$. Now, the preparation for matching evaluation is completed.

Figure 12:
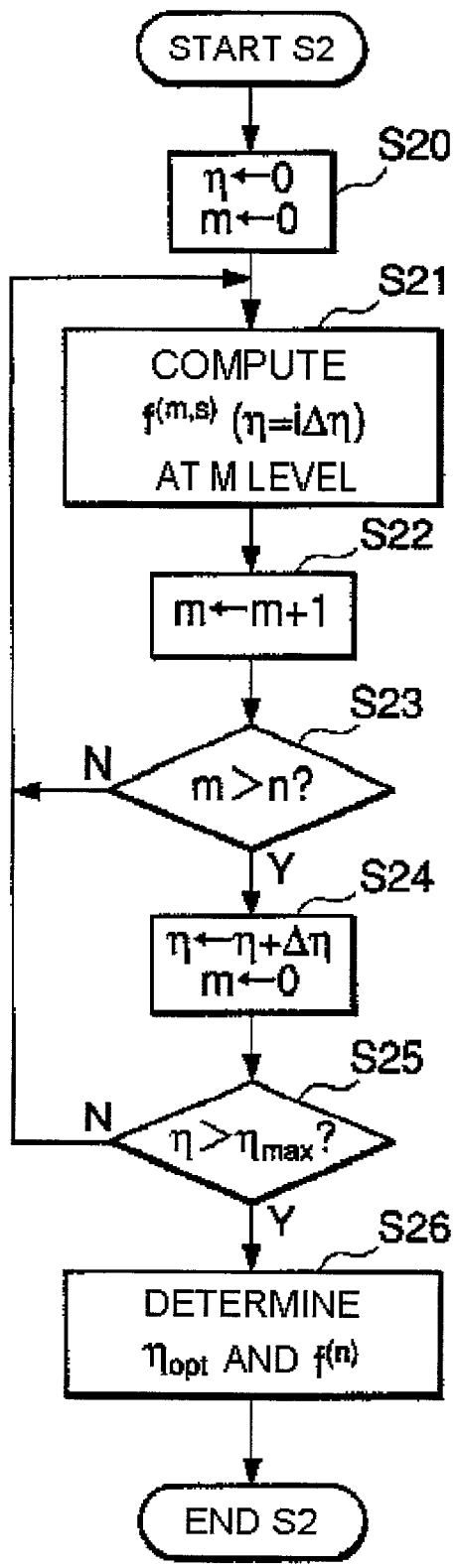
FIG. 12 is a flowchart showing the details of the process at S2 in FIG. 6.

FIG. 12 is a flowchart showing the details of the process of S2 shown in FIG. 6. As described in [1], the source hierarchical images and destination hierarchical images are matched between images having the same level of resolution. In order to detect global correspondence correctly, a matching is calculated in sequence from a coarse level to a fine level of resolution. Since the source and destination hierarchical images are generated using the critical point filter, the location and intensity of critical points are stored clearly even at a coarse level. Thus, the result of the global matching is superior to conventional methods.

Referring to FIG. 12, a coefficient parameter η and a level parameter m are set to 0 (S20). Then, a matching is computed between the four subimages at the m-th level of the source hierarchical images and those of the destination hierarchical images at the m-th level, so that four types of submappings $f^{(m,s)}$ (s=0, 1, 2, 3) which satisfy the BC and minimize the energy are obtained (S21). The BC is checked by using the inherited quadrilateral described in [1.3.3]. In that case, the submappings at the m-th level are constrained by those at the (m-1)th level, as indicated by the equations (17) and (18). Thus, the matching computed at a coarser level of resolution is used in subsequent calculation of a matching. This is called a vertical reference between different levels. If m=0, there is no coarser level and this exceptional case will be described using FIG. 13.

A horizontal reference within the same level is also performed. As indicated by the equation (20) in [1.3.3], $f^{(m,3)}$, $f^{(m,2)}$ and $f^{(m,1)}$ are respectively determined so as to be analogous to $f^{(m,2)}$, $f^{(m,1)}$ and $f^{(m,0)}$. This is because a situation in which the submappings are totally different seems unnatural even though the type of critical points differs so long as the critical points are originally included in the same source and destination images. As can been seen from the equation (20), the closer the submappings are to each other, the smaller the energy becomes, so that the matching is then considered more satisfactory.

As for $f^{(m,0)}$, which is to be initially determined, a coarser level by one may be referred to since there is no other submapping at the same level to be referred to as shown in the equation (19). In this base technology, however, a procedure is adopted such that after the submappings were obtained up to $f^{(m,3)}$, $f^{(m,0)}$ is recalculated once utilizing the thus obtained subampppings as a constraint. This procedure is equivalent to a process in which s=4 is substituted into the equation (20) and $f^{(m,4)}$ is set to $f^{(m,0)}$ anew. The above process is employed to avoid the tendency in which the degree of association between $f^{(m,0)}$ and $f^{(m,3)}$ becomes too low. This scheme actually produced a preferable result. In addition to this scheme, the submappings are shuffled in the experiment as described in [1.7.1], so as to closely maintain the degrees of association among submappings which are originally determined independently for each type of critical point. Furthermore, in order to prevent the tendency of being dependent on the starting point in the process, the location thereof is changed according to the value of s as described in [1.7].

Figure 13:
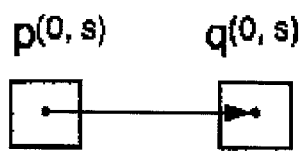
FIG. 13 is a diagram showing the way a submapping is determined at the 0-th level.
Figure 14:
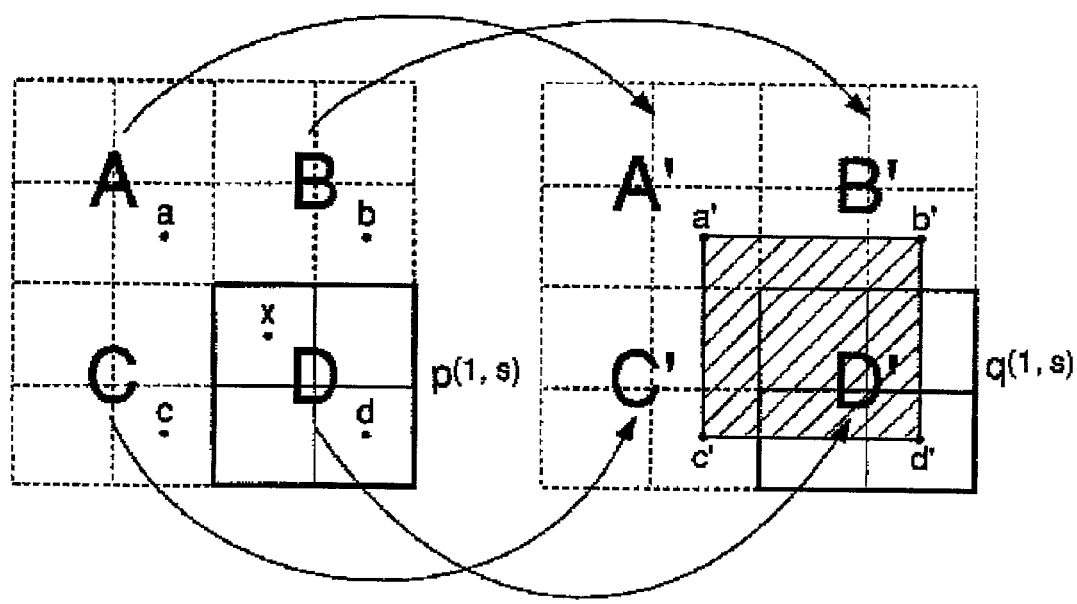
FIG. 14 is a diagram showing the way a submapping is determined at the first level.

FIG. 13 illustrates how the submapping is determined at the 0-th level. Since at the 0-th level each sub-image is consitituted by a single pixel, the four submappings $f^{(0,s)}$ are automatically chosen as the identity mapping. FIG. 14 shows how the submappings are determined at the first level. At the first level, each of the sub-images is constituted of four pixels, which are indicated by solid lines. When a corresponding point (pixel) of the point (pixel) x in $p^{(1,s)}$ is searched within $q^{(1,s)}$, the following procedure is adopted:

1. An upper left point a, an upper right point b, a lower left point c and a lower right point d with respect to the point x are obtained at the first level of resolution.
2. Pixels to which the points a to d belong at a coarser level by one, i.e., the 0-th level, are searched. In FIG. 14, the points a to d belong to the pixels A to D, respectively. However, the pixels A to C are virtual pixels which do not exist in reality.
3. The corresponding points A' to D' of the pixels A to D, which have already been defined at the 0-th level, are plotted in $q^{(1,s)}$. The pixels A' to C' are virtual pixels and regarded to be located at the same positions as the pixels A to C.
4. The corresponding point a' to the point a in the pixel A is regarded as being located inside the pixel A', and the point a' is plotted. Then, it is assumed that the position occupied by the point a in the pixel A (in this case, positioned at the lower right) is the same as the position occupied by the point a' in the pixel A'.
5. The corresponding points b' to d' are plotted by using the same method as the above 4 so as to produce an inherited quadrilateral defined by the points a' to d'.
6. The corresponding point x' of the point x is searched such that the energy becomes minimum in the inherited quadrilateral. Candidate corresponding points x' may be limited to the pixels, for instance, whose centers are included in the inherited quadrilateral. In the case shown in FIG. 14, the four pixels all become candidates.

The above described is a procedure for determining the corresponding point of a given point x. The same processing is performed on all other points so as to determine the submappings. As the inherited quadrilateral is expected to become deformed at the upper levels (higher than the second level), the pixels A' to D' will be positioned apart from one another as shown in FIG. 3.

Once the four submappings at the m-th level are determined in this manner, m is incremented (S22 in FIG. 12). Then, when it is confirmed that m does not exceed n (S23), return to S21. Thereafter, every time the process returns to S21, submappings at a finer level of resolution are obtained until the process finally returns to S21 at which time the mapping $f^{(n)}$ at the n-th level is determined. This mapping is denoted as $f^{(n)}(\eta=0)$ because it has been determined relative to $\eta=0$.

Next, to obtain the mapping with respect to other different $\eta$, $\eta$ is shifted by $\Delta\eta$ and m is reset to zero (S24). After confirming that new $\eta$ does not exceed a predetermined search-stop value $\eta_{max}$(S25), the process returns to S21 and the mapping $f^{(n)}$ ($\eta=\Delta\eta$) relative to the new $\eta$ is obtained. This process is repeated while obtaining $f^{(n)}(\eta=i\Delta\eta)$ (i=0,1, . . . ) at S21. When $\eta$ exceeds $\eta_{max}$, the process proceeds to S26 and the optimal $\eta=\eta_{opt}$ is determined using a method described later, so as to let $f^{(n)}(\eta=\eta_{opt})$ be the final mapping $f^{(n)}$.

Figure 15:
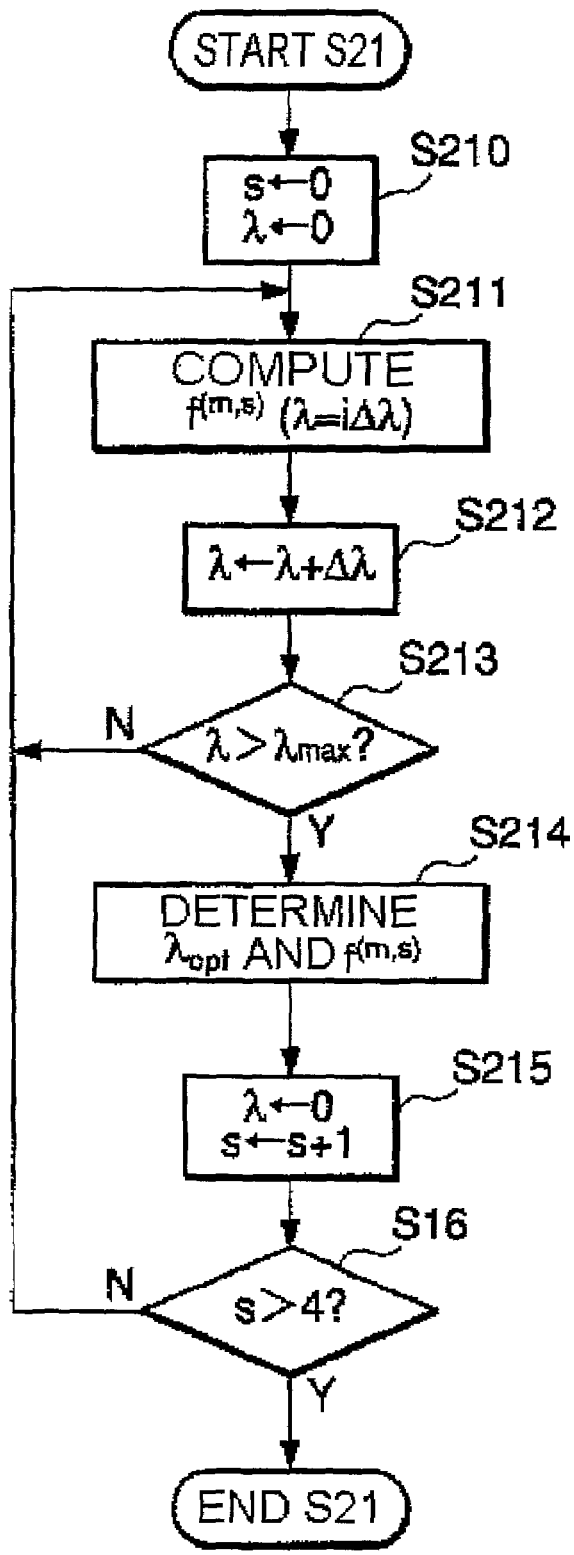
FIG. 15 is a flowchart showing the details of the process at S21 in FIG. 12.

FIG. 15 is a flowchart showing the details of the process of S21 shown in FIG. 12. According to this flowchart, the submappings at the m-th level are determined for a certain predetermined $\eta$. In this base technology, when determining the mappings, the optimal $\lambda$ is defined independently for each submapping.

Referring to FIG. 15, s and $\lambda$ are first reset to zero (S210). Then, obtained is the submapping $f^{(m,s)}$ that minimizes the energy with respect to the then $\lambda$ (and, implicitly, $\eta$) (S211), and the thus obtained submapping is denoted as $f^{(m,s)}(\lambda=0)$. In order to obtain the mapping with respect to other different $\lambda$, $\lambda$ is shifted by $\Delta\lambda$. After confirming that the new $\lambda$ does not exceed a predetermined search-stop value $\lambda_{max}$ (S213), the process returns to S211 and the mapping $f^{(m,s)}$ ($\lambda=\Delta\lambda$) relative to the new $\lambda$ is obtained. This process is repeated while obtaining $f^{(m,s)}(\lambda=i\Delta\lambda)$(i=0,1, . . . ). When $\lambda$ exceeds $\lambda_{max}$, the process proceeds to S214 and the optimal $\lambda=\lambda_{opt}$ is determined, so as to let $f^{(n)}(\lambda=\lambda_{opt})$ be the final mapping $f^{(m,s)}$ (S214).

Next, in order to obtain other submappings at the same level, $\lambda$ is reset to zero and s is incremented (S215). After confirming that s does not exceed 4 (S216), return to S211. When s=4, $f^{(m,0)}$ is renewed utilizing $f^{(m,3)}$ as described above and a submapping at that level is determined.

Figure 16:
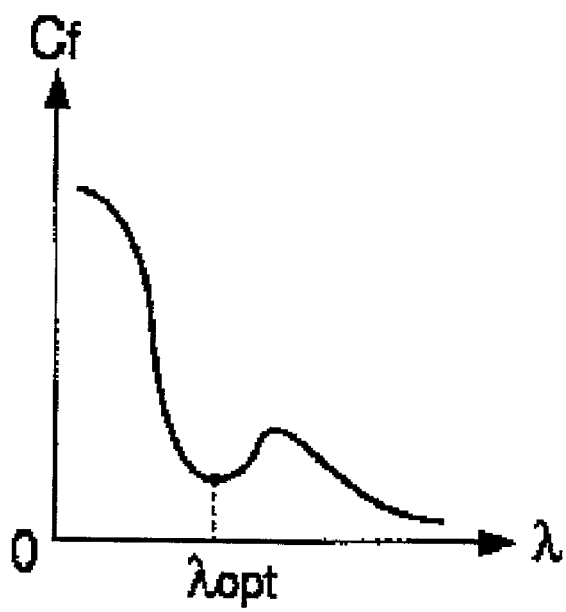
FIG. 16 is a graph showing the behavior of energy $$C_f^{(m,s)}$$

FIG. 16 shows the behavior of the energy $$C_f^{(m,s)}$$

corresponding to $f^{(m,s)}(\lambda=i\Delta\lambda)(i=0,1, . . . )$ for a certain m and s while varying $\lambda$. As described in [1.4], as $\lambda$ increases, $$C_f^{(m,s)}$$

normally decreases but changes to increase after $\lambda$ exceeds the optimal value. In this base technology, $\lambda$ in which $$C_f^{(m,s)}$$

becomes the minima is defined as $\lambda_{opt}$. As observed in FIG. 16, even if $$C_f^{(m,s)}$$

begins to decrease again in the range $\lambda>\lambda_{opt}$, the mapping will not be as good. For this reason, it suffices to pay attention to the first occurring minima value. In this base technology, $\lambda_{opt}$ is independently determined for each submapping including $f^{(n)}$.

FIG. 17 shows the behavior of the energy $$C_f^{(n)}$$

corresponding to $f^{(n)}(\eta=i\Delta\eta)(i=0,1, . . . )$ while varying $\eta$. Here too, $$C_f^{(n)}$$

normally decreases as $\eta$ increases, but $$C_f^{(n)}$$

changes to increase after $\eta$ exceeds the optimal value. Thus, $\eta$ in which $$C_f^{(n)}$$

becomes the minima is defined as $\eta_{opt}$. FIG. 17 can be considered as an enlarged graph around zero along the horizontal axis shown in FIG. 4. Once $\eta_{opt}$ is determined, $f_{(n)}$ can be finally determined.

As described above, this base technology provides various merits. First, since there is no need to detect edges, problems in connection with the conventional techniques of the edge detection type are solved. Furthermore, prior knowledge about objects included in an image is not necessitated, thus automatic detection of corresponding points is achieved. Using the critical point filter, it is possible to preserve intensity and locations of critical points even at a coarse level of resolution, thus being extremely advantageous when applied to object recognition, characteristic extraction, and image matching. As a result, it is possible to construct an image processing system which significantly reduces manual labor.

Some further extensions to or modifications of the above-described base technology may be made as follows:

(1) Parameters are automatically determined when the matching is computed between the source and destination hierarchical images in the base technology. This method can be applied not only to the calculation of the matching between the hierarchical images but also to computing the matching between two images in general.

For instance, an energy $E_0$ relative to a difference in the intensity of pixels and an energy $E_1$ relative to a positional displacement of pixels between two images may be used as evaluation equations, and a linear sum of these equations, i.e., $E_{tot}=\alpha E_0+E_1$, may be used as a combined evaluation equation. While paying attention to the neighborhood of the extrema in this combined evaluation equation, $\alpha$ is automatically determined. Namely, mappings which minimize $E_{tot}$ are obtained for various $\alpha$'s. Among such mappings, $\alpha$ at which $E_{tot}$ takes the minimum value is defined as an optimal parameter. The mapping corresponding to this parameter is finally regarded as the optimal mapping between the two images.

Many other methods are available in the course of setting up evaluation equations. For instance, a term which becomes larger as the evaluation result becomes more favorable, such as $1/E_1$ and $1/E_2$, may be employed. A combined evaluation equation is not necessarily a linear sum, but an n-powered sum (n=2, ½, −1, −2, etc.), a polynomial or an arbitrary function may be employed when appropriate.

The system may employ a single parameter such as the above $\alpha$, two parameters such as $\eta$ and $\lambda$ as in the base technology, or more than two parameters. When there are more than three parameters used, they may be determined while changing one at a time.

(2) In the base technology, a parameter is determined in a two-step process. That is, in such a manner that a point at which $C_f^{(m,s)}$ takes the minima is detected after a mapping such that the value of the combined evaluation equation becomes minimum is determined. However, instead of this two-step processing, a parameter may be effectively determined, as the case may be, in a manner such that the minimum value of a combined evaluation equation becomes minimum. In this case, $\alpha E_0+\beta E_1$, for example, may be used as the combined evaluation equation, where $\alpha+\beta=1$ may be imposed as a constraint so as to equally treat each evaluation equation. The automatic determination of a parameter is effective when determining the parameter such that the energy becomes minimum.

(3) In the base technology, four types of submappings related to four types of critical points are generated at each level of resolution. However, one, two, or three types among the four types may be selectively used. For instance, if there exists only one bright point in an image, generation of hierarchical images based solely on $f^{(m,3)}$ related to a maxima point can be effective to a certain degree. In this case, no other submapping is necessary at the same level, thus the amount of computation relative on s is effectively reduced.

(4) In the base technology, as the level of resolution of an image advances by one through a critical point filter, the number of pixels becomes 1/4. However, it is possible to suppose that one block consists of 3×3 pixels and critical points are searched in this 3×3 block, then the number of pixels will be 1/9 as the level advances by one.

(5) In the base technology, if the source and the destination images are color images, they would generally first be converted to monochrome images, and the mappings then computed. The source color images may then be transformed by using the mappings thus obtained. However, as an alternate method, the submappings may be computed regarding each RGB component.

Preferred Embodiments for Image Data Coding and Decoding

In the above-described base technology, the correspondence data are generated by computing a matching between key frames and, based on this correspondence information, an intermediate frame is generated. As such, this technology can be used for the compression of motion or moving pictures. In fact, experiments are beginning to show evidence of both picture quality and compression rates that are superior to those of MPEG. An image coding technology utilizing the base technology will now be described with reference to FIGS. 18 to 34. This image coding technology, which takes transmission errors into consideration, is intended to be a useful elemental technique for the distribution of motion pictures utilizing the base technology.

(Coding Side)

FIG. 18 shows a structure of an image coding apparatus 10 according to an embodiment of the invention. The image coding apparatus 10 includes an image input unit 12 which receives data of key frames $KF_i$, a matching processor 14 which generates a correspondence data file or files $C_{i,j}$ by computing a matching between key frames $KF_i$ and $KF_j$, and a stream generator 16 which generates a coded data stream CBS (Coded Bit Stream) (sometimes simply referred to as a data stream hereinafter), by incorporating the key frame data and the correspondence data file or files. The data stream may be stored in a storage unit 18 as needed.

Key frames are defined, for instance, by extracting frames of motion pictures at predetermined time intervals, such as 0.5 seconds, and intermediate frames, which are the frames between key frames, are generated by an interpolation computation based on the correspondence data file at a decoding stage. It is to be appreciated here that the image input unit 12 may either receive already existing key frames from an external storage device (not shown), network (not shown) or the like or may be an image photographing device which captures images, such as a digital camera.

The matching processor 14 performs a pixel-by-pixel matching between two key frames, based on critical points or otherwise, applying the base technology or some other arbitrary technology. Unlike the case with the base technology, the matching processor 14 computes a matching not only between adjacent key frames but also key frames that are a predetermined distance away from each other (i.e. predetermined at timings). This matching will be called a "spare matching" hereinafter. The spare matching generates correspondence data for coping with transmission errors or the like. Namely, when there is a data error in key frame data or in a correspondence data file during transmission and so forth, this will be remedied by the spare matching correspondence data file (also referred to as a "spare file" hereinafter) which is obtained by the spare matching.

Now, for nonnegative integers i and j, let us define data of an i-th key frame and a j-th key frame as $KF_i$ and $KF_j$, respectively, and define a correspondence data file between the i-th key frame and the j-th key frame as $C_{i,j}$. Then, the matching processor 14 can be configured in a manner such that the matching processor 14 generates $C_{i,i+1}$ by utilizing $KF_i$ and $KF_{i+1}$ among input key frame data, and generates a spare $C_{i,j}$ by utilizing $KF_i$ and $KF_j$ (j>i+1). It is to be noted that $C_{i,j}$ is generated with lower frequency compared to $C_{i,i+1}$. In order to check for transmission errors, the matching processor 14 adds a parity bit to the correspondence data files $C_{i,i+1}$ and $C_{i,j}$. In order to check for transmission errors in the key frames, the image input unit 12 or the stream generator 16 may add a parity bit or bits to the key frames, as described in more detail below.

FIG. 19 shows a relationship between the ordinary correspondence data file (also referred to as a "main file" hereinafter) and a spare file. Referring to FIG. 19, the main file is generated one at a time between adjacent key frames in sequence. On the other hand, spare files $C_{0,6}, C_{6,12} \ldots$ are generated with some interval therebetween.

FIG. 20 shows a structure of the data stream CBS which is generated in a manner that the main files and spare files shown in FIG. 19 are incorporated thereto by the stream generator 16. If no countermeasure against error is considered, this stream will be such that key frames and main files appear in a predetermined sequence. Specifically, the key frames and the main files appear in the order of $KF_0$, $KF_1$, $C_{0,1}$, $KF_2$, $C_{1,2}$, $KF_3$, $C_{2,3}$, .... The spare files $C_{0,6}$, $C_{6,12}$ are inserted before $KF_0$ and $KF_7$, respectively. A method for coping with transmission error using the spare file will be described below when describing a decoding stage.

Although the insertion position of the spare file is somewhat arbitrary, the following two points need to be taken into consideration in general. As a first point, it is preferable that key frames and main files covered by a spare file (also simply referred to as a "covering area" hereinafter) are, to a certain degree, away from the position of the spare file. This is because a case when the transmission error extends or occurs simultaneously to both the spare file and the cover file should be avoided. As a second point, though contrary to the first point, the both shall be disposed close to each other, to a certain degree. This is because the spare file needs to be present at the time of reproduction of the covering area, and the spare files cannot be sent later unless the covering area is in a stand-by state. On the other hand, if the spare files are sent in advance, these need to be stored in a buffer for a long period of time. Thus, it is desirable that a capacity of a device and so forth be taken into account, and the positions of the spare files be determined through some experiments or the like. It is to be noted that the same spare file may be embedded a plurality of times in different places.

FIG. 21 shows another possible relationship between a main file and a spare file. Here, $C_{0,6}$, $C_{4,10}$, ..., etc. are generated in a manner that the covering areas of the spare files are overlapping with one another. FIG. 22 shows a structure of the data stream CBS which corresponds to FIG. 21. Here, spare files $C_{4,10}$ and $C_{8,14}$, ... are inserted before $KF_5$, $KF_9$, ..., respectively. The error tolerance further improves due to the overlapping effects.

FIG. 23 shows still another relationship between a main file and a spare file. Here, in addition to the spare files $C_{0,6}$, $C_{6,12}$, ..., spare files ($C_{0,12}$, $C_{12,24}$, ...) which cover a longer interval are added. FIG. 24 shows a structure of the data stream CBS which corresponds to FIG. 23. Here, spare files $C_{0,12}$, $C_{0,6}$, $C_{6,12}$, ... are inserted in the head of the stream and before $KF_3$ and $KF_7$, respectively. In a case of this structure, when there is an error in, for example, the covering area of $C_{0,6}$, $C_{0,6}$ will be used at a primary stage. If there is also an error in $C_{0,6}$, then $C_{0,12}$ can be used at a secondary stage, thus further improving the error tolerance.

As described above, error checking data, such as parity bits, are added to key frames and correspondence data files. For key frames, it may not be necessary to check for errors in the whole frame since some types of errors, such as those at the edges, may be less important. FIG. 25 shows an area of a key frame $KF_i$ in which a data error is to be detected. Here, sixteen block regions $R_0$–$R_{15}$ are provided in the vicinity of the center of an image, and one-dimensional or two-dimensional parity bit is added for each block. In this case, it has been determined that the area close to the center of the key frame is of higher importance and only errors in that area will be dealt with. However, of course, the whole area of the image may also be taken into account. Moreover, a region considered to have high importance in general such as a region having a high image intensity may be dynamically determined, so that errors in said region may be considered.

FIG. 26 shows conceptually an area of a correspondence data file $C_{i,j}$ in which a data error is to be detected. This file generally stores text data and, here, is simply divided into a plurality of data blocks $T_0$–$T_4$, so that each block is given a parity bit.

(Decoding Side)

FIG. 27 shows a structure of an image decoding apparatus 40 according to an embodiment. The image decoding apparatus 40 includes a stream input unit 42 which receives or acquires a coded data stream CBS, an intermediate image generator 44 which generates an intermediate frame from the stream by interpolation based on, for example, the base technology, and a display controller 50 which performs a processing to display key frames and intermediate frames as moving pictures. Display data generated by the display controller 50 are outputted to a display device where images are reproduced. An error detector 46 detects an error in the data stream. If there is an error in the data stream, the error detector 46 notifies an error controller 48 to that effect. The error controller 48 incorporates a predetermined error avoidance processing to generation of intermediate frames in the intermediate image generator 44. The stream input unit 42 and the intermediate image generator 44 have respective buffer memories or a shared buffer memory which are or is utilized as a work area for data necessary for decoding or error avoidance processing. Hereinafter, data of an intermediate frame for $KF_i$ and $KF_j$ will be denoted as $IF_{i,j}$.

FIG. 28 illustrates a principle of generation of intermediate frames by the intermediate image generator 44. This processing itself was also introduced in the base technology. Namely, when there are two frames $KF_5$ and $KF_6$ and their main file $C_{5,6}$, it is first confirmed by this main file $C_{5,6}$ that a point $p_0(x_0, y_0)$ on the key frame $KF_5$ corresponds to a point $p_1(x_1, y_1)$ on other key frame $KF_6$. A point is specified by a coordinate $(x_i, y_i)$ and a pixel value $p_i$. Thus, a point $p_t(x_t, y_t)$ on an intermediate frame $IF_{5,6}(t)$ for these key frames is obtained by interpolating the coordinate and the pixel value on the time axis.

FIG. 29 shows an error avoidance processing controlled by the error controller 48 when an error is detected in $KF_6$ of a data stream CBS that is being processed by the image decoding apparatus 40. Here, a key frame $KF_5$, which is a key frame immediately before $KF_6$, is copied to $KF_6$, and this copied $KF_5$ is utilized as $KF_6$. Of course, alternatively a key frame which comes after $KF_6$ may be utilized, or a weighted average or the like of key frames before and after $KF_6$ may be utilized.

FIG. 30 shows another error avoidance processing when an error is similarly detected in $KF_6$. Here, the error-containing $KF_6$ is not used at all. Instead, each point of $KF_5$ is moved using $C_{5,6}$, so as to generate $IF_{5,6}$. In other words, movement of pixels only is traced by $C_{5,6}$, and the change of pixel values to be traced primarily is omitted because $KF_6$ is not available. $IF_{5,6}$ which is the intermediate frame representing part of $KF_6$ is generated by a transformation or deformation of $KF_5$.

FIG. 31 shows an error avoidance processing when an error is detected in two key frames $KF_6$ and $KF_7$, in a row.

Here, $KF_6$ and $KF_7$ are not used, instead, each point of $KF_5$ is moved by utilizing $C_{5,6}$, so as to generate $IF_{5,6}$. As a result, $KF_6$ is virtually generated as a destination image. Thereafter, each point of this virtually generated $KF_6$ is moved by utilizing $C_{6,7}$, so as to generate $IF_{6,7}$. Then, $KF_7$ is virtually generated as a destination image, and is utilized for subsequent processing.

FIG. 32 shows still another type of error avoidance processing. Here, an error is detected in more than one of key frames $KF_1$–$KF_5$, or, as the case may be, a main file related thereto, for example, $C_{2,3}$. Based on an instruction from the error controller 48, the intermediate image generator 44 first selects a spare file generated for key frames that interpose an error portion, among spare files included in the data stream CBS. Referring to FIG. 32, $C_{0,6}$ is detected, thus this $C_{0,6}$, $KF_0$ and $KF_6$ are utilized. As a result, intermediate frames $IF_{0,6}$ over a rather long interval therebetween is generated. Even if the error continues over a relatively long period of time, this method of reproducing images with a certain level of image quality is extremely useful.

The following describes a method which generalizes the above example error avoidance processes. Namely, when an error occurs in $KF_{i+1}$, an error avoidance processing is performed in a manner such that $C_{a,b}$, where $a \leq i+1$, $i+2 < b$ or $a < i+1$, $i+2 \leq b$, is detected among spare files, and $IF_{a,b}$ is generated by utilizing $C_{a,b}$, $KF_a$ and $KF_b$, thereby this $IF_{a,b}$ or a part thereof is substituted for $IF_{i+1,i+2}$.

There may also be a case where, $C_{a,b}$, $a << i+1$, $i+2 << b$, is used. This may occur when such a spare file is the only one that is available or when the number of spare files is to be reduced deliberately.

FIG. 33 shows still another error avoidance processing. Here, suppose that error occurred in a main file $C_{5,6}$. In this case, $C_{4,5}$ which is the main file immediately before $C_{5,6}$ is copied and is substituted for the error-containing $C_{5,6}$. Of course, alternatively, a main file which comes after $C_{5,6}$ may be copied, or a weighted average or the like of main files before and after $C_{5,6}$ may be utilized.

FIG. 34 shows still another error avoidance processing. Here, too, an error occures in the main file $C_{5,6}$. Here, the content of the file $C_{5,6}$ is replaced with correspondence data that indicates an identity mapping. The "identity mapping" is a mapping such that $f(x)=x$. Here, the identity mapping is thought of as a case where all of the pixels of $KF_5$ correspond to the same coordinates of $KF_6$. This method is effective because, in a movie or video sequence of frames, differences between two adjacent key frames are, in general, not very large. This method may also be effective in a case where main files are lost in a comparatively consecutive manner.

It is useful to note that, even when error is detected in a data stream CBS, the execution of the error avoidance processing may be abandoned, put off or reconsidered if it is determined that the seriousness or importance of the error is substantially low. Recall that, as shown in FIG. 25, regions of a key frame may be configured so that error checking may be performed primarily on the important area or areas only, however, even though error checking is possible over the whole area, errors may be ignored at the decoding side if the error occurs in, for example, an edge of an image. In particular, it may be possible for some cooperation and special arrangement to be effected between the coding side and decoding side to determine which types of errors are to be ignored or corrected.

Although the present invention has been described by way of exemplary embodiments, it should be understood that many changes and substitutions may be made by those skilled in the art without departing from the scope of the present invention which is defined by the appended claims. Thus, the present invention is not limited to the embodiments described herein, and various modifications thereto are also effective as and encompassed by the present invention.

What is claimed is:

1. An image decoding apparatus in which, for nonnegative integers i and j, data of an i-th key frame and a j-th key frame are defined as $KF_i$ and $KF_j$, respectively, a correspondence data file between the i-th key frame and the j-th key frame is defined as $C_{i,j}$, and data of an intermediate frame between the i-th key frame and the j-th key frame is defined as $IF_{i,j}$, the apparatus comprising:

an error detector which receives a data stream that includes $KF_i$, $KF_{i+1}$ and $C_{i,i+1}$, and detects whether or nor there is an error in the data stream;

an intermediate image generator which generates $IF_{i,i+1}$ from the data stream; and an error controller which, when an error occurs in the data stream, controls said intermediate image generator in a manner such that an error avoidance processing is performed in said intermediate image generator.

2. An image decoding apparatus according to claim 1, wherein, when the error occurs in $KF_{i+1}$, the error avoidance processing is performed by substituting data of another key frame for $KF_{i+1}$.

3. An image decoding apparatus according to claim 2, wherein, the error avoidance processing is performed by substituting either $KF_i$ or $KF_{i+2}$ for $KF_{i+1}$.

4. An image decoding apparatus according to claim 1, wherein, when the error occurs in $KF_{i+1}$, the error avoidance processing is performed in a manner such that $IF_{i,i+1}$ is generated based on data of another key frame and a correspondence data file relating thereto.

5. An image decoding apparatus according to claim 4, wherein, the error avoidance processing is performed in a manner such that $IF_{i,i+1}$ is generated by deforming $KF_i$ based on $KF_i$ and $C_{i,i+1}$, without using $KF_{i+1}$.

6. An image decoding apparatus according to claim 1, wherein, when the error occurs in $KF_{i+1}$ and $KF_{i+2}$, the error avoidance processing is performed in a manner such that $IF_{i,i+1}$ is generated based on data of at least one key frame other than $KF_{i+1}$ and $KF_{i+2}$, and at least two correspondence data files relating thereto.

7. An image decoding apparatus according to claim 6, wherein, the error avoidance processing is performed in a manner such that $IF_{i,i+2}$ is generated by deforming $KF_i$ based on $C_{i,i+1}$ and $C_{i+1,i+2}$, without using $KF_{i+1}$ and $KF_{i+2}$.

8. An image decoding apparatus according to claim 1, wherein, when the error occurs in $KF_{i+1}$, the error avoidance processing is performed in a manner such that a correspondence data file $C_{a,b}$, $\leq i+1$ and $i+2 < b$, included in the data stream is detected, $IF_{a,b}$ is generated by utilizing $C_{a,b}$, $KF_a$ and $KF_b$ and then part of the generated $IF_{a,b}$ is substituted for $IF_{i+1,i+2}$.

9. An image decoding apparatus according to claim 1, wherein, when the error occurs in KFi+1, the error avoidance processing is performed in a manner such that a correspondence data file $C_{a,b}$, $a < i+1$ and $i+2 \leq b$, included in the data stream is detected, IFa,b is generated by utilizing $C_{a,b}$, $KF_a$ and $KF_b$ and then at least a part of the generated $IF_{a,b}$ is substituted for IFi+1,i+2.

10. An image decoding apparatus according to claim 1, wherein, when the error occurs in $KF_{i+1}$, the avoidance processing is performed in a manner such that a correspondence data file $C_{a,b}$, $a << i+1$ and $i+2 << b$, included in the data stream is detected, $IF_{a,b}$ is generated by utilizing $C_{a,b}$, $KF_a$ and $KF_b$ and then part of the generated $IF_{a,b}$ is substituted for $IF_{i+1,i+2}$.

11. An image decoding apparatus according to claim 1, wherein, when the error occurs in $C_{i+1,i+2}$, the error avoidance processing is performed in a manner such that another correspondence data file is substituted for $C_{i+1,i+2}$.

12. An image decoding apparatus according to claim 11, wherein the error avoidance processing is performed in a manner such that either $C_{i,i+1}$ or $C_{i+2,i+3}$ is substituted for $C_{i+1,i+2}$.

13. An image decoding apparatus according to claim 1, wherein, when the error occurs in $C_{i+1,i+2}$, the error avoidance processing is performed in a manner such that a new correspondence data file generated based on at least two other correspondence data files is substituted for $C_{i+1,i+2}$.

14. An image decoding apparatus according to claim 13, wherein, the error avoidance processing is performed in a manner such that a new correspondence data file generated based on both $C_{i,i+1}$ and $C_{i+2,i+3}$ is substituted for $C_{i+1,i+2}$.

15. An image decoding apparatus according to claim 1, wherein, when the error occurs in $C_{i+1,i+2}$, the error avoidance processing is performed in a manner such that $C_{i+1,i+2}$ is adjusted to specify an identity mapping.

16. An image decoding apparatus according to claim 1, wherein, said error controller abandons the error avoidance processing in the event that it is judged that seriousness of the error is below a predetermined level.

17. An image decoding apparatus according to claim 1, wherein the correspondence data file $C_{i,j}$ is generated based on a pixel-based matching computation between $KF_i$ and $KF_j$ and said intermediate image generator generates an intermediate frame $IF_{i,j}$ by interpolation based on $KF_i$, $KF_j$ and $C_{i,j}$.

18. An image coding apparatus in which, for nonnegative integers i and j, data of an i-th key frame and a j-th key frame are defined as $KF_i$ and $KF_j$, respectively, and a correspondence data file between the i-th key frame and the j-th key frame is defined as $C_{i,j}$, the apparatus comprising:
an image input unit which receives data for key frames;
a correspondence data generator which generates Ci,i+1 by utilizing KFi and KFi+1, and generates Ci,j by utilizing KFi and KFj,j>i+1, among the input key frame data; and
a stream generator which generates a data stream including data generated by said correspondence data generator.

19. An image coding apparatus according to claim 18, wherein said correspondence data generator generates $C_{i,j}$ in a manner such that intensity of $C_{i,j}$ is lower than that of the $C_{i,i+1}$.

20. An image coding apparatus according to claim 18, wherein said correspondence data generator generates $C_{i,i+1}$ and $C_{i,j}$ in a manner such that data used for checking for errors are embedded in the $C_{i,i+1}$ and $C_{i,j}$.

21. An image coding apparatus according to claim 18, wherein said correspondence data generator generates correspondence data files by computing a matching between critical points detected through a two-dimensional search respectively conducted on two key frames.

22. An image coding apparatus according to claim 18, wherein a portion of a frame is divided into a plurality of block regions to each of which a parity bit is added, and error is detected in only said portion which is considered to be of high importance.

23. An image coding apparatus according to claim 18, wherein a portion of $C_{i,j}$ is divided into a plurality of data blocks and each of the data blocks is provided with a parity bit.

24. An image decoding method comprising:
acquiring a data stream that includes a plurality of key frames and a correspondence data file therebetween;
generating an intermediate frame between the key frames, from the data stream; and
monitoring for an error in the data stream,
wherein, when an error is detected, an error avoidance processing is performed at the time of said generating the intermediate frame, and when the error is detected in a correspondence data file, the error avoidance processing is performed in a manner such that the intermediate frame is generated from another correspondence data file which is substituted for the error-containing correspondence data file.

25. An image decoding method comprising:
acquiring a data stream that includes a plurality of key frames and a correspondence data file therebetween;
generating an intermediate frame between the key frames, from the data stream; and
monitoring for an error in the data stream,
wherein, when an error is detected, an error avoidance processing is performed at the time of said generating the intermediate frame, and when the error is detected in a correspondence data file, the error avoidance processing is performed in a manner such that the intermediate frame is generated based on a new correspondence data file generated based on another correspondence data file.

* * * * *